United States Patent [19]

Matsuda

[11] Patent Number: 4,660,896
[45] Date of Patent: Apr. 28, 1987

[54] ANTI-SKID BRAKE CONTROL SYSTEM WITH VARIABLE PRESSURE INCREASING RATE

[75] Inventor: Toshiro Matsuda, Sagamihara, Japan
[73] Assignee: Nissan Motor Company, Limited, Yokohama, Japan
[21] Appl. No.: 680,765
[22] Filed: Dec. 11, 1984
[30] Foreign Application Priority Data Dec. 13, 1983 [JP] Japan ................... 58-233627

[51] Int. Cl.⁴ ............................................. B60T 8/70
[52] U.S. Cl. ..................................... 303/106; 303/97; 364/426
[58] Field of Search .................... 303/95, 96, 97, 105, 303/106, 109, 110, 61; 364/426

[56] References Cited

U.S. PATENT DOCUMENTS

| | | | |
|---|---|---|---|
| 3,637,264 | 1/1972 | Leiber et al. | 303/105 |
| 3,847,449 | 11/1974 | Adahan | 303/116 |
| 3,901,559 | 8/1975 | Iwada | 303/61 |
| 4,384,330 | 5/1983 | Matsuda et al. | 303/109 |
| 4,392,202 | 7/1983 | Matsuda | 303/109 |
| 4,430,714 | 2/1984 | Matsuda et al. | 303/95 |

FOREIGN PATENT DOCUMENTS 89096 8/1976 Japan.

*Primary Examiner*—John W. Caldwell, Sr.
*Assistant Examiner*—Alvin Oberley
*Attorney, Agent, or Firm*—Schwartz, Jeffery, Schwaab, Mack, Blumenthal & Evans

[57] ABSTRACT

An anti-skid brake control system comprises a detector for detecting the peak value of wheel acceleration in each cycle of skid control. Braking pressure is increased in step-wise fashion by alternately operating a pressure control valve between an application mode in which working fluid is supplied to a wheel cylinder to increase the braking pressure and a hold mode in which the wheel cylinder is blocked from fluid communication to a hydraulic brake circuit to hold the braking pressure constant. The duration for holding the pressure control valve in the application mode is adjusted depending upon the detected peak value of wheel acceleration, whereby an average increasing rate of braking pressure is variable depending upon the peak value of the wheel acceleration.

16 Claims, 33 Drawing Figures

ANTI-SKID BRAKE CONTROL SYSTEM WITH VARIABLE PRESSURE INCREASING RATE

BACKGROUND OF THE INVENTION

The present invention relates generally to an anti-slid brake control system for an automotive brake system for optimizing braking efficiency of a vehicle. More particularly, the invention relates to an anti-skid brake control system which allows variations of increasing rates of fluid pressures to be apply to a wheel cylinder of each vehicular wheel depending upon braking condition.

As is well known, optimum braking characteristics are obtained when braking pressure or force can be so adjusted that the peripheral speed of the wheels during braking is held to a given ratio, e.g. about 80% to 85%, of the vehicle speed. This practice is believed to be particularly effective when road conditions and other factors are taken into consideration. On the other hand, if wheel speed is held to a ratio to the vehicle speed higher than the above-mentioned optimal ratio, e.g., 80% to 85%, braking distance may be prolong due to lack of braking pressure. On the other hand, if the braking pressure is so adjusted as to hold the wheel speed to a ratio with respect the vehicle speed less than the aforementioned optimal ratio, the vehicle wheels may lock and skid, resulting in an unnecessarily long braking distance due to reduced traction. In practice, it is very difficult to precisely adjust the braking pressure so that the wheel speed is held to the given optimal ratio to the vehicle speed.

In the practical anti-skid brake control operation, braking pressure in one or more wheel cylinders is adjusted by cyclically increasing and decreasing the braking pressure in the wheel cylinder. The anti-skid control system generally decreases braking pressure when the wheel deceleration value becomes greater than a given deceleration threshold, which is so chosen as to prevent the wheel from skidding, and increases braking pressure when the wheel acceleration value is greater than a given acceleration threshold. In this conventional anti-skid brake control procedure, wheel speed does not remain in an optimal relationship to the vehicle speed for a satisfactorily long period of time.

U.S. Pat. No. 3,637,264, issued on Jan. 25, 1972 to Leiber et al discloses an antilocking control for pressure actuated brakes. The pressure of the brake-actuating fluid in an antilocking brake control system is varied by pulsing the control valve or valves for durations which are varied to be greater or lesser than the period of that limiting frequency above which the brake system cannot respond. In the former case, a rapid increase in fluid pressure or a rapid decrease in fluid pressure occurs, whereas in the latter case, a less rapid average or net increase or decrease occurs in the fluid pressure to which the brake system responds. These conditions are controlled in dependence on the rotational behavior of the vehicle wheel or wheels and more especially in dependence or predetermined changes in angular velocity of the wheel. Moreover, either variation in pulse duration at a fixed frequency or variation in frequency at a fixed pulse duration may be effected during high-frequency pulsing so as further to alter the net increase or decrease in fluid pressure. This further alternation is effected as a function of time from the beginning of the high-frequency pulsing.

In addition, Published Japanese Patent Application (Tokkai) Showa No. 51-89096, published on Aug. 4, 1976 discloses a system similar to the above. The fluid pressure in the wheel cylinder is increased in a stepwise manner. Duration of increase of the fluid pressure is adjusted in accordance with the rate of increase of the fluid pressure in one or more preceding steps.

In practical procedures in application of vehicular brakes, relatively quick take-up of braking pressure at the wheel cylinder is required at an initial stage of braking operation so that response time can be shortened or minimized. In the subsequent stage, relatively moderate increase of braking pressure at the wheel cylinder may assist to hold the braking pressure near the lock pressure around which optimum braking efficiency would be obtained. In the prior art as exampled above, relatively moderate braking pressure building up characteristics may be obtained by varying the braking pressure in a stepwise fashion. Such a system prolongates the period for holding the anti-skid brake control system at an APPLICATION mode in which braking pressure increases. However, in the conventional system, since the average increasing rate of the braking pressure during the APPLICATION mode may be held constant or approximately constant, it has not been possible to increase braking pressure quickly during the initial stage braking operation or to sufficiently prolongate holding the system in the APPLICATION mode.

SUMMARY OF THE INVENTION

Therefore, it is an object of the present invention to provide an anti-skid brake control system in which increasing rate of braking pressure at the wheel cylinder is variable depending upon the braking condition.

Another object of the invention is to provide an anti-skid brake control system which varies the increasing rate of braking pressure depending upon wheel acceleration detected during wheel speed recovery.

In order to accomplish the above-mentioned and other objects, an anti-skid brake control system, according to the present invention, comprises a detector for detecting the peak value of wheel acceleration in each cycle of skid control. Braking pressure is increased in a step-wise fashion by operating a pressure control valve between an APPLICATION mode in which working fluid is supplied to a wheel cylinder to increase the braking pressure and a HOLD mode in which the wheel cylinder is blocked from fluid communication to a hydraulic brake circuit to hold the braking pressure constant, in alternative fashion. The duration for holding the pressure control valve is adjusted depending upon the detected peak value of wheel acceleration. Whereby the average increasing rate of braking pressure is variable depending upon the peak value of the wheel acceleration. The duration for holding the pressure control valve in the APPLICATION mode is derived in proportion to the peak value of the wheel acceleration by taking the demand derived by the peak value of wheel acceleration into account.

Therefore, according to the invention, precise braking pressure increasing characteristics can be obtained with respect to required braking pressure increasing speed. For instance, while the peak value of wheel acceleration is high, the average increasing rate is correspondingly high to build up braking pressure to approximately the lock pressure at an earlier timing. On the other hand, when the peak value is relatively low, the average increasing rate is lowered corresponding thereto to moderately build up the braking pressure so that the braking pressure may be maintained nearby the lock pressure for a relatively long period of time. This apparently improves braking characteristics of the vehicular brake and successfully shortens or minimizes braking distance.

According to one aspect of the invention, an anti-skid brake control system for an automotive brake system comprises a hydraulic brake system including a wheel cylinder for applying braking pressure to a vehicle wheel, and a pressure control valve associated with the wheel cylinder for adjusting fluid pressure in the wheel cylinder, the pressure control valve being operative to increase fluid pressure in the wheel cylinder in its first position, to decrease fluid pressure in the wheel cylinder in its second position and to hold fluid pressure in the wheel cylinder constant in its third position, a wheel speed sensor detecting rotation speed of the wheel and producing a wheel speed indicative signal having a value indicative of the detected wheel speed, a controller operative in a first mode in which the pressure control valve is operated to the first and third positions alternatively, a second mode in which the pressure control valve is operated to the second position and a third mode in which the pressure control valve is operated to the third position, selecting one of the first, second and third mode so as to control the wheel speed at a given optimal relationship to vehicle speed on the basis of predetermined brake control parameters including a wheel acceleration based on variation of the wheel speed indicative signal values, and deriving a control signal indicative on one of the first, second and third mode selected for controlling operation of the pressure control valve to actuate the latter to one of the first, second and third positions, said controller being responsive to wheel acceleration increasing above a predetermined value for operation in said first mode to alternatively switch said pressure control valve positions between said first and third positions and varying a first period of time for maintaining said pressure control valve in said first position depending upon a peak value of said wheel acceleration, thereby adjusting the average increasing rate of fluid pressure in said wheel cylinder depending upon said peak value of said wheel acceleration.

According to another aspect of the invention, an anti-skid brake control system for an automotive vehicle, comprises a hydraulic brake system including a wheel cylinder for applying braking pressure to a vehicle wheel, and a pressure control valve associated with the wheel cylinder for adjusting fluid pressure in the wheel cylinder, the pressure control valve being operative to increase fluid pressure in the wheel cylinder in its first position, to decrease the fluid pressure in the wheel cylinder in its second position and to hold the fluid pressure in the wheel cylinder constant in its third position, a wheel speed sensor detecting rotation speed of the wheel and producing a wheel speed indicative signal having a value indicative of the detected wheel speed, a first means for deriving brake control parameters including wheel acceleration value based on the wheel speed indicative signal, a second means for latching the peak value of wheel acceleration while wheel speed is increasing, and a third means for deriving a control signal for actuating the pressure control valve to one of the first, second and third positions based on the brake control parameters, the third means deriving the control signal so as to operate the pressure control valve in the first position for a first given period of time, and to switch the position of the pressure control valve to the third position for a second given period of timer after expiration of the first given period, the third means operating the pressure control valve alternatively in the first and third positions with a duty cycle defined by the first and second periods of time, and the third means deriving the first given period of time in accordance with the latched peak value of wheel acceleration.

According to a further aspect of the invetion, a method for anti-skid controlling an automotive hydraulic brake system including a wheel cylinder and a pressure control valve for controlling fluid pressure in the wheel cylinder, the pressure control valve being operative to increase fluid pressure in the wheel cylinder in its first position, to decrease fluid pressure in the wheel cylinder in its second position and to control the fluid pressure in the wheel cylinder constant in its third position, the method comprising the steps of:

detecting wheel speed;

deriving brake control parameters including wheel acceleration and deceleration based on the detected wheel speed;

determining the operation mode of the pressure control valve from among the first, second and third positions depending upon the derived brake control parameters;

detecting the peak value of wheel acceleration;

deriving a peak-value-dependent period of time based on the detected peak value of wheel acceleration; and controlling the pressure control valve according to a predetermined schedule for controlling wheel speed at an optimal relationship to a vehicle speed, in which the pressure control valve is held in the first position for the peak-value-dependent period of time, is thereafter held in the third position for a given period of time, and repeating the procedure for holding the pressure control valve for the peak-value-dependent period of time in the first position and holding the pressure control valve for a given period in the third position so that an average increasing rate of braking pressure, increasing in stepwise fashion, is variable depending upon the peak value of the wheel acceleration.

BRIEF DESCRIPTION OF THE DRAWINGS

The present invention will be understood more fully from the detailed description given below and from the accompanying drawings of the preferred embodiments of the present invention, which, however, should not be taken to limit the invention to the specific embodiments, but are for explanation and understanding only.

DESCRIPTION OF THE PREFERRED EMBODIMENT

Figure 1:
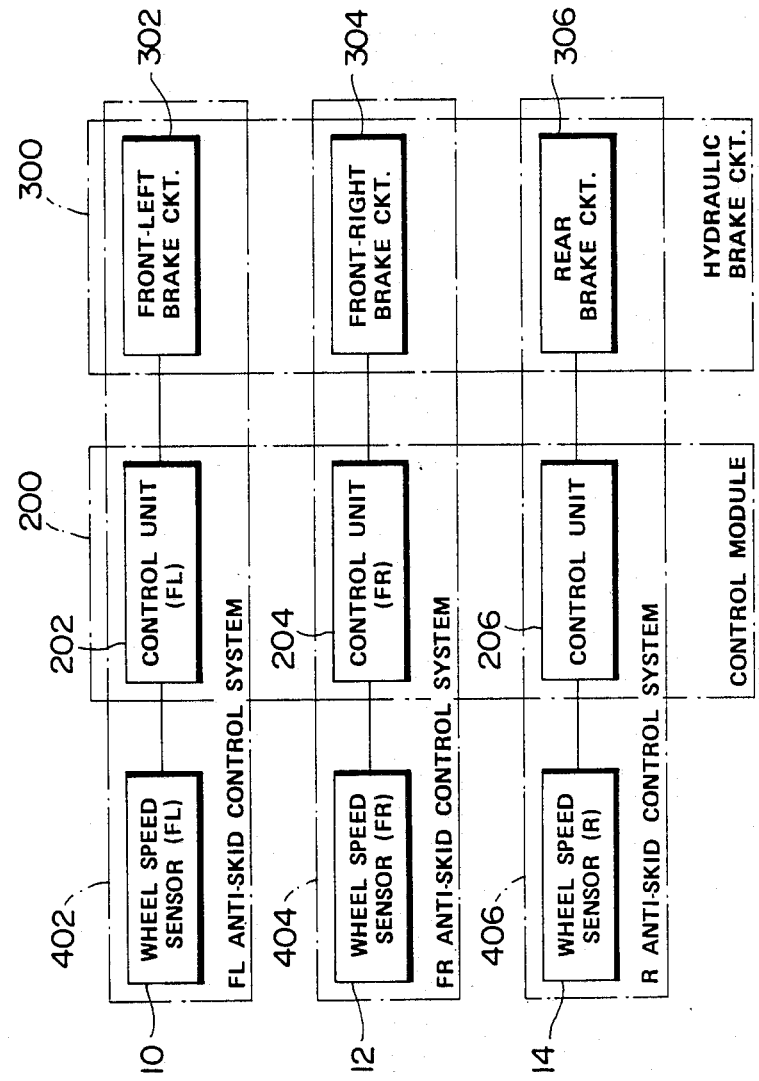
FIG. 1 is a schematic block diagram of the overall design of the preferred embodiment of an anti-skid brake control system according to the present invention.

Referring to the drawings, particularly to FIGS. 1 to 10, an anti-skid brake control system, according to the present invention, includes independently operative three anti-skid control circuits 402, 404 and 406 respectively controlling front-left (FL) wheel, front-right (FR) wheel and rear (R) wheels. The anti-skid control circuit 402, 404 and 406 respectively includes digital controller units 202, 204 and 206 which are housed in a common controller housing to form a control module 200.

The controller unit 202 provided in the front-left anti-skid control circuit 402, is connected to a wheel speed sensor 10 for producing an alternative current form sensor signal having a frequency proportional to rotation speed of a front-left wheel (not shown). On the other hand, the controller unit 202 is also connected to an electromagnetic actuator 16 in a front-left brake circuit 302. The brake circuit 302 includes a front-left wheel cylinder 30a for operating a brake shoe assembly 30 for applying braking force to a brake disc rotor 28, and an electromagnetic pressure control valve 16a operated by the actuator 16 for controlling fluid pressure to be applied to the wheel cylinder 30a and whereby controlling the braking force.

Similarly, the controller unit 204 of the front-right anti-skid control circuit 404 is connected to a wheel speed sensor 204 to receive alternative current form sensor signal with a frequency representative of rotation speed of the front-right wheel. The controller unit 204 is, in turn, connected to an actuator 18 in a front-right brake circuit 304. The actuator 18 is adapted to operate an electromagnetic pressure control valve 18a for controlling hydraulic pressure to be applied to a front-right wheel cylinder 34a. With the controlled hydraulic pressure, the wheel cylinder 34a operates a front-right brake shoe assembly 34 for applying braking force to a brake disc rotor 32 rotating with the front-right wheel.

In addition, the controller unit 206 is connected to a wheel speed sensor 14 to receive therefrom an alternative current sensor signal having a frequency indicative of the average rotation speed of rear wheels. In order to detect average rotation speed of the rear wheels, the wheel speed sensor 14 may be adapted to detect rotation speed of propeller shaft or the equivalent rotating at the approximately average speed of the rear wheels. The controller unit 206 is also connected to an electromagnetic actuator 20 of an electromagnetic pressure control valve 20a. The electromagnetic valve 20a is associated with rear wheel cylinders 38a for controlling fluid pressure to be applied to the rear wheel cylinders and whereby controlling braking pressure to be applied to rear brake disc rotors 36 through rear brake shoe assemblies 38a.

It should be appreciated that through the controller units 202, 204 and 206 are adapted to control respectively the front-left, front-right and rear brake circuits 302, 304 and 306, since the embodiment shown is directed to an anti-skid brake control system for a vehicle having a driving arrangement of a front-engine, rear wheel drive vehicle, the invention can be modified to apply any driving arrangement of the vehicle, such as front-engine, front wheel drive or four wheel drive arrangements. In addition, though the disclosed brake system comprises disc brakes, the anti-skid brake control system according to the invention can also be applied to drum-type brake system.

The controller units 202, 204 and 206 are respectively associated with actuator drive circuits to control operations of corresponding actuators 16, 18 and 20. In addition, each of the controller units 202, 204 and 206 is connected to a corresponding wheel speed sensor 10, 12 and 14 via shaping circuits incorporated in the controller 200. Each of the wheel speed sensors 10, 12 and 14 is adapted to produce an alternating-current sensor signal having a frequency related to or proportional to the rotation speed of the corresponding vehicle wheel. Each of the A-C sensor signals is converted by the corresponding shaping circuit into a rectangular pulse signal which will be hereafter referred to as "sensor pulse signal". As can be appreciated, since the frequency of the A-C sensor signals is proportional to the wheel speed, the frequency of the sensor pulse signal should correspond to the wheel rotation speed and the pulse intervals thereof will be inversely proportional to the wheel rotation speed.

The controller units 202, 204 and 206 operate independently and continuously process the sensor pulse signal to derive control signals for controlling the fluid pressure in each of the wheel cylinders 30a, 34a and 38a in such a way that the slip rate R at each of the vehicle wheels is optimized to shorten the distance required to stop the vehicle, which distance will be hereafter referred to as "braking distance".

In general, each controller unit 202, 204 and 206 monitors receipt of the corresponding sensor pulses so that it can derive the pulse interval between the times of receipt of successive sensor pulses. Based on the derived pulse interval, the controller units 202, 204 and 206 calculate instantaneous wheel speed $V_w$ and instantaneous wheel acceleration or deceleration $a_w$. From these measured and derived values, a target wheel speed $V_i$ is derived, which is an assumed value derived from the wheel speed at which a slip is assumed to zero or approximately zero. The target wheel speed $V_i$ varies at a constant decelerating rate derived from variation of the wheel speed. The target wheel speed thus corresponds to a vehicle speed which itself is based on variation of the wheel speed. Based on the difference between the instantaneous wheel speed $V_w$ and the target wheel speed $V_i$, a slip rate R is derived. The controller units 202, 204 and 206 determine the appropriate operational mode for increasing, decreasing or holding the hydraulic brake pressure applied to the wheel cylinders 30a, 34a and 38a. The control mode in which the brake pressure is increased will be hereafter referred to as "application mode". The control mode in which the brake pressure is decreased will be hereafter referred to as "release mode". The mode in which the brake pressure is held essentially constant will be hereafter referred to as "hold mode". The anti-skid control operation consists of a loop of the application mode, hold mode, release mode and hold mode. This loop is repeated throughout the anti-skid brake control operation cyclically. One cycle of the loop of the control variation will be hereafter referred to as "skid cycle".

Figure 2:
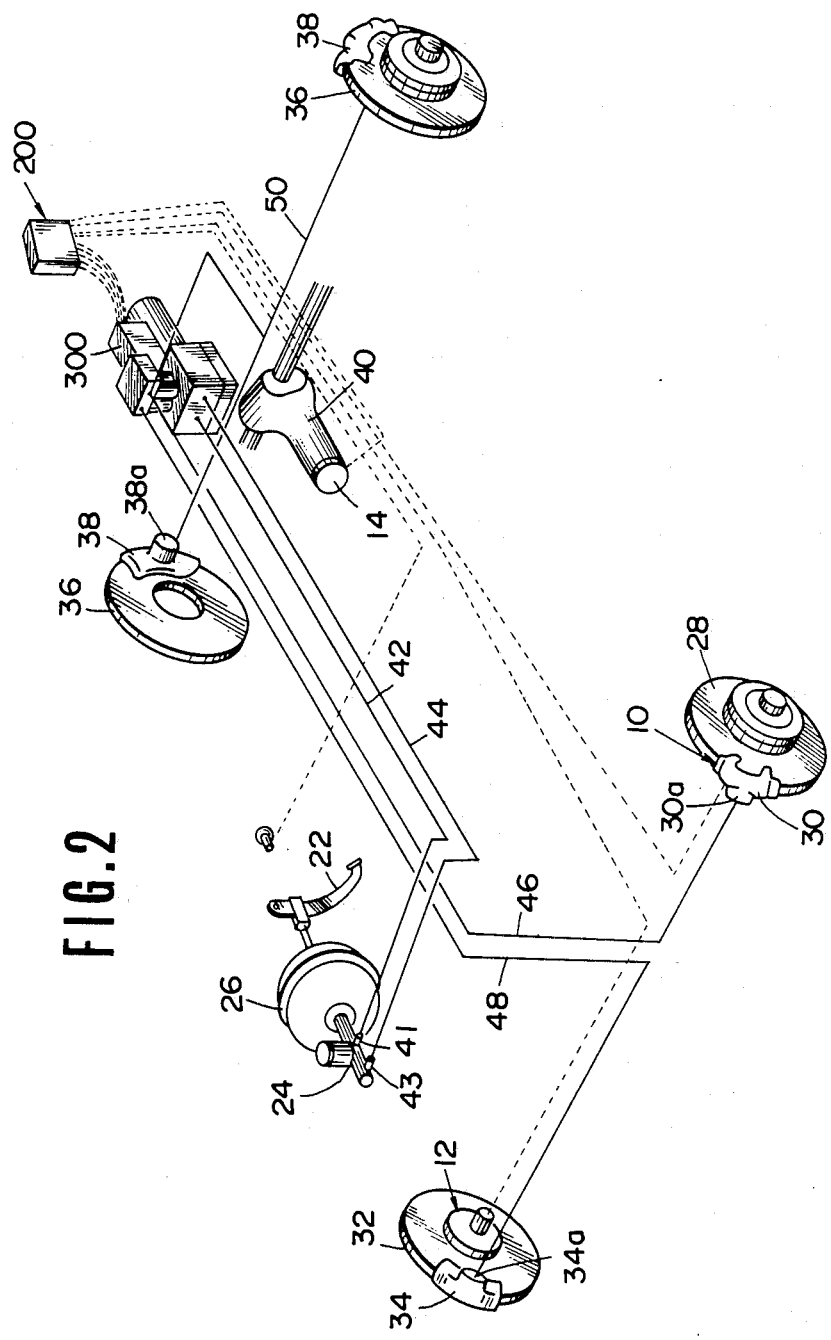
FIG. 2 is a perspective view of the hydraulic circuits of the anti-skid brake system according to the present invention.

FIG. 2 shows portions of the hydraulic brake system of an automotive vehicle to which the preferred embodiment of the anti-skid control system is applied. The wheel speed sensors 10 and 12 are respectively provided adjacent the brake disc rotor 28 and 32 for rotation therewith so as to produce sensor signals having frequencies proportional to the wheel rotation speed and variable in accordance with variation of the wheel speed. On the other hand, the wheel speed sensor 14 is provided adjacent a propeller shaft near the differential gear box or drive pinion shaft 116 for rotation therewith. (See FIG. 8). Since the rotation speeds of the left and right rear wheels are free to vary independently depending upon driving conditions due to the effect of the differential gear box 40, the rear wheel speed detected by the rear wheel speed sensor 14 is the average of the speeds of the left and right wheels. Throughout the specification, "rear wheel speed" will mean the average rotation speed of the left and right rear wheels.

As shown in FIG. 2, the actuator unit 300 is connected to a master wheel cylinder 24 via primary and secondary outlet ports 41 and 43 thereof and via pressure lines 44 and 42. The master wheel cylinder 24 is, in turn, associated with a brake pedal 22 via a powder booster 26 which is adapted to boost the braking force applied to the brake pedal 22 before applying same to the master cylinder. The actuator unit 300 is also connected to wheel cylinders 30a, 34a and 38a via brake pressure lines 46, 48 and 50.

Figure 3:
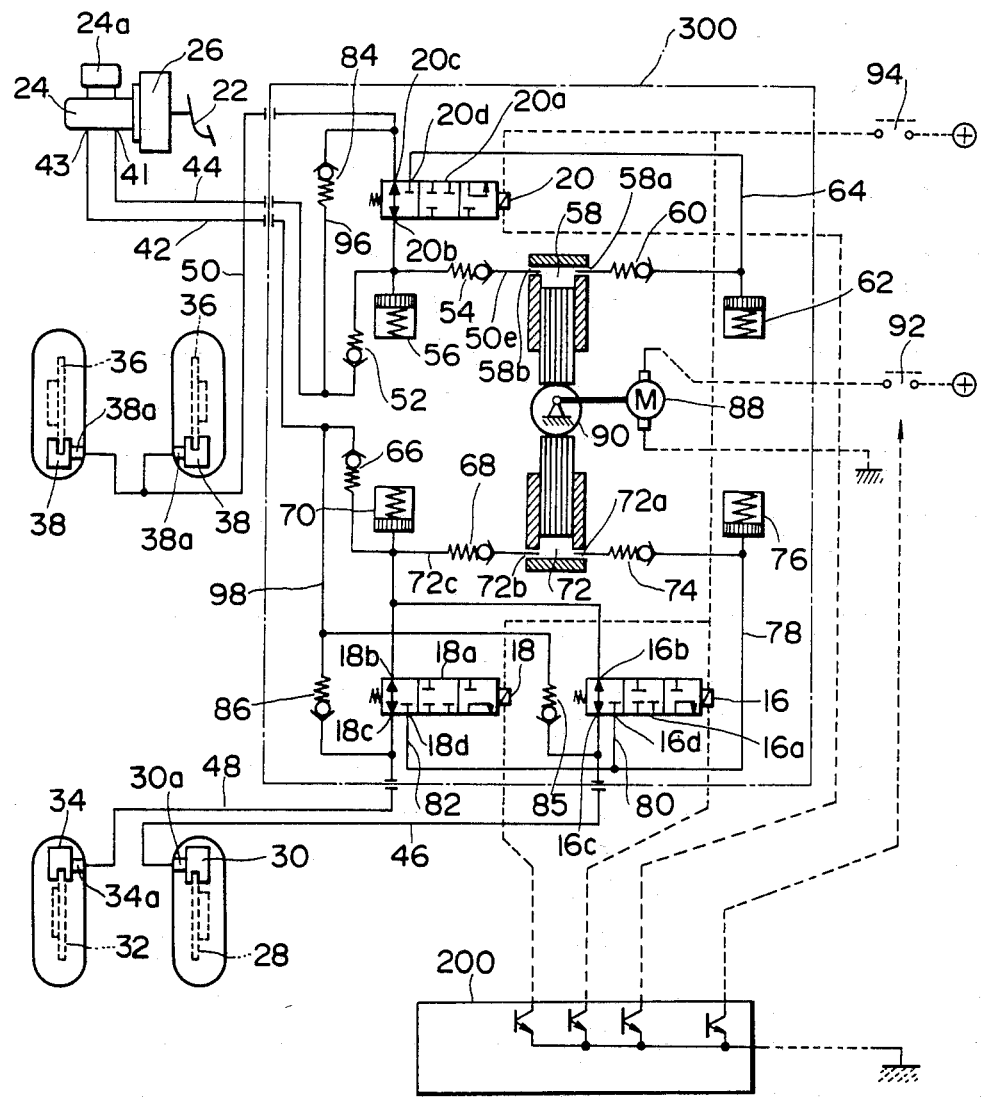
FIG. 3 is a circuit diagram of the hydraulic circuits performing the anti-skid control according to the present invention.

The circuit lay-out of the hydraulic brake system circuit will be described in detail below with reference to FIG. 3 which is only an example of the hydraulic brake system to which the preferred embodiment of the anti-skid control system according to the present invention can be applied, and so it should be appreciated that it is not intended to limit the hydraulic system to the embodiment shown. In FIG. 3, the secondary outlet port 43 is connected to the inlet ports 16b and 18b of electromagnetic flow control valves 16a and 18a, the respective outlet ports 16c and 18c of which are connected to corresponding left and right wheel cylinders 30a and 34a, via the secondary pressure lines 46 and 48. The primary outlet port 41 is connected to the inlet port 20b of the electromagnetic valve 20a, the outlet port 20c of which is connected to the rear wheel cylinders 38a, via a primary pressure line 50. The electromagnetic valves 16a, 18a and 20a also have drain ports 16d, 18d and 20d. The drain ports 16d and 18d are connected to the inlet port 72a of a fluid pump 90 via drain passages 80, 82 and 78. The fluid pump 90 is associated with an electric motor 88 to be driven by the latter which is, in turn, connected to a motor relay 92, the duty cycle of which is controlled by means of a control signal from the control module 200. While the motor relay 92 is energized to be turned ON, the motor 88 is in operation to drive the fluid pump 90. The drain port 20d of the electromagnetic flow control valve 20a is connected to the inlet port 58a of the fluid pump 90 via a drain passage 64.

The outlet ports 72b and 58b are respectively connected to the pressure lines 42 and 44 via a return passages 72c and 58c. The outlet ports 16c, 18c and 20c of respective electromagnetic flow control valves 16a, 18a and 20a are connected to corresponding wheel cylinders 30a, 34a and 38a via braking lines 46, 48 and 50. Bypass passages 96 and 98 are provided to connect the braking pressure lines 46 and 48, and 50 respectively to the pressure lines 42 and 44, bypassing the electromagnetic flow control valves.

Pump pressure check valves 52 and 66 are installed in the pressure lines 42 and 44. Each of the pump pressure check valves 66 and 52 is adapted to prevent the working fluid pressurized by the fluid pump 90 from transmitting pressure surges to the master cylinder 24. Since the fluid pump 90 is designed for quick release of the braking pressure in the braking pressure lines 46, 48 and 50 and thus releasing the wheel cylinders 30a, 34a and 38a from the braking pressure, it is driven upon release of the brake pedal. This would result in pressure surges in the working fluid from the fluid pump 90 to the master cylinder 24 if the pump pressure check valves 66 and 52 were not provided. The pump pressure check valves 66 and 52 serve as one-way check valves allowing fluid flow from the master cylinder 24 to the inlet ports 16b, 18b and 20b of the electromagnetic valves 16a, 18a and 20a. Pressure accumulators 70 and 56 are installed in the pressure lines 42 and 44, which pressure accumulators serve to accumulate fluid pressure generated at the outlet ports 72b and 58b of the fluid pump 90 while the inlet ports 16b, 18b and 20b are closed. Toward this end, the pressure accumulators 70 and 56 are connected to the outlet ports 72b and 58b of the fluid pump 90 via the return passages 72c and 58c. Outlet valves 68 and 54 are one-way check valves allowing one-way fluid communication from the fluid pump to the pressure accumulators. These outlet valves 68 and 54 are effective for preventing the pressure accumulated in the pressure accumulators 70 and 56 from surging to the fluid pump when the pump is deactivated. In addition, the outlet valves 68 and 54 are also effective to prevent the pressurized fluid flowing through the pressure lines 42 and 44 from flowing into the fluid pump 90 through the return passages 72c and 58c.

Inlet check valves 74 and 60 are inserted in the drain passages 78 and 64 for preventing surge flow of the pressurized fluid in the fluid pump 90 to the electromagnetic flow control valves 16a, 18a and 20a after the braking pressure in the wheel cylinders is released. The fluid flowing through the drain passages 78 and 64 is temporarily retained in fluid reservoirs 76 and 62 connected to the former.

Bypass check valves 85, 86 and 84 are inserted in the bypass passages 98 and 96 for preventing the fluid in the pressure lines 42 and 44 from flowing to the braking pressure lines 46, 48 and 50 without first passing through the electromagnetic flow control valves 16a, 18a and 20a. On the other hand, the bypass check valves 85, 86 and 84 are adapted to permit fluid flow from the braking pressure line 46, 48 and 50 to the pressure lines 42 and 44 when the master cylinder 24 is released and thus the line pressure in the pressure lines 42 and 44 becomes less than the pressure in the braking pressure lines 46, 48 and 50.

The electromagnetic flow control valves 16a, 18a and 20a are respectively associated with the actuators 16, 18 and 20 to be controlled by means of the control signals from the control module 200. The actuators 16, 18 and 20 are all connected to the control module 200 via an actuator relay 94, which thus controls the energization and deenergization of them all. Operation of the electromagnetic valve 16a in cooperation with the actuator 16 will be illustrated with reference to FIGS. 4, 5 and 6, in particular illustrating the application mode, hold mode and release mode, respectively.

It should be appreciated that the operation of the electromagnetic valves 18a and 20a are substantially the same as that of the valve 16a. Therefore, disclosure of the valve operations of the electromagnetic valves 18a and 20a is omitted in order to avoid unnecessary repetition and for simplification of the disclosure.

APPLICATION MODE

In this position, the actuator 16 remains deenergized. An anchor of the electromagnetic valve 16a thus remains in its initial position allowing fluid flow between the inlet port 16b and the outlet port 16c so that the pressurized fluid supplied from the master cylinder 24 via the pressure line 42 may flow to the left front wheel cylinder 30a via the braking pressure line 46. In this valve position, the drain port 16d is closed to block fluid flow from the pressure line 42 to the drain passage 78. As a result, the line pressure in the braking pressure line 46 is increased in proportion to the magnitude of depression of the brake pedal 22 and thereby the fluid pressure in the left front wheel cylinder 30a is increased correspondingly.

In this case, when the braking force applied to the brake pedal is released, the line pressure in the pressure line 42 drops due to return of the master cylinder 24 to its initial position. As a result, the line pressure in the braking pressure line 46 becomes higher than that in the pressure line 42 and so opens the bypass valve 85 to permit fluid flow through the bypass passage 98 to return the working fluid to the fluid reservoir 24a of the master cylinder 24.

In the preferring construction, the pump pressure check valve 66, normally serving as a one-way check valve for preventing fluid flow from the electromagnetic valve 16a to the master cylinder 24, becomes wide-open in response to drop of the line pressure in the pressure line below a given pressure. This allows the fluid in the braking pressure line 46 to flow backwards through the electromagnetic valve 16a and the pump pressure check valve 66 to the master cylinder 24 via the pressure line 42. This function of the pump pressure check valve 66 facilitates full release of the braking pressure in the wheel cylinder 30a.

For instance, the bypass valve 85 is rated at a given set pressure, e.g. 2 kg/cm$^2$ and closes when the pressure difference between the pressure line 42 and the braking pressure line 46 drops below the set pressure. As a result, fluid pressure approximating the bypass valve set pressure tends to remain in the braking pressure line 46, preventing the wheel cylinder 30a from returning to the fully released position. In order to avoid this, in the shown embodiment, the one-way check valve function of the pump pressure check valve 66 is disabled when the line pressure in the pressure line 42 drops below a predetermined pressure, e.g. 10 kg/cm$^2$. When the line pressure in the pressure line 42 drops below the predetermined pressure, a bias force normally applied to the pump pressure check valve 66 is released, freeing the valve to allow fluid flow from the braking pressure line 46 to the master cylinder 24 via the pressure line 42.

HOLD MODE

In this control mode, a limited first value, e.g. 2A of electric current serving as the control signal is applied to the actuator 16 to position the anchor closer to the actuator 16 than in the previous case. As a result, the inlet port 16b and the drain port 16d are closed to block fluid communication between the pressure line 42 and the braking pressure line 46 and between the braking pressure line and the drain passage 78. Therefore, the fluid pressure in the braking pressure line 46 is held at the level extant at the moment the actuator is operated by the control signal.

In this case, the fluid pressure applied through the master cylinder flows through the pressure check valve 66 to the pressure accumulator 70.

RELEASE MODE

In this control mode, a maximum value, e.g. 5A of electric current serving as the control signal is applied to the actuator 16 to shift the anchor all the way toward the actuator 16. As a result, the drain port 16d is opened to establish fluid communication between the drain port 16d and the outlet port 16c. At this time, the fluid pump 90 serves to facilitate fluid flow from the braking pressure line 46 to the drain passage 78. The fluid flowing through the drain passage is partly accumulated in the fluid reservoir 76 and the remainder flows to the pressure accumulator 70 via the check valves 60 and 54 and the fluid pump 90.

It will be appreciated that, even in this release mode, the fluid pressure in the pressure line 42 remains at a level higher or equal to that in the braking pressure line 46, so that fluid flow from the braking pressure line 46 to the pressure line 42 via the bypass passage 98 and via the bypass check valve 85 will never occur.

In order to resume the braking pressure in the wheel cylinder (FL) 30a after once the braking pressure is reduced by positioning the electromagnetic valve 16a in the release position, the actuator 16 is again denergized. The electromagnetic valve 16a is thus returns to its initial position to allow the fluid flow between the inlet port 16b and the outlet port 16c so that the pressurized fluid may flow to the left front wheel cylinder 30a via the braking pressure line 46. As set forth the drain port 16d is closed to block fluid flow from the pressure line 42 to the drain passage 78.

As a result, the pressure accumulator 70 is connected to the left front wheel cylinder 30a via the electromagnetic valve 16a and the braking pressure line 46. The pressurized fluid in the pressure accumulator 70 is thus supplied to the wheel cylinder 30a so as to resume the fluid pressure in the wheel cylinder 30a.

At this time, as the pressure accumulator 70 is connected to the fluid reservoir 76 via the check valves 60 and 54 which allow fluid flow from the fluid reservoir to the pressure accumulator, the extra amount of pressurized fluid may be supplied from the fluid reservoir.

The design of the wheel speed sensors 10, 12 and 14 employed in the preferred embodiment of the anti-skid control system will be described in detail with reference to FIGS. 7 to 9.

Figure 7:
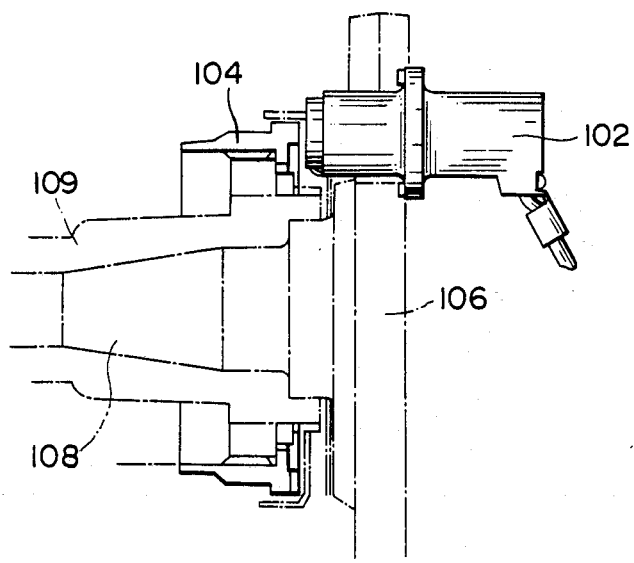
FIG. 7 is a perspective view of a wheel speed sensor adapted to detect the speed of a front wheel.

FIG. 7 shows the structure of the wheel speed sensor 10 for detecting the rate of rotation of the left front wheel. The wheel speed sensor 10 generally comprises a sensor rotor 104 adapted to rotate with the vehicle wheel, and a sensor assembly 102 fixedly secured to the shim portion 106 of the knuckle spindle 108. The sensor rotor 104 is fixedly secured to a wheel hub 109 for rotation with the vehicle wheel.

Figure 9:
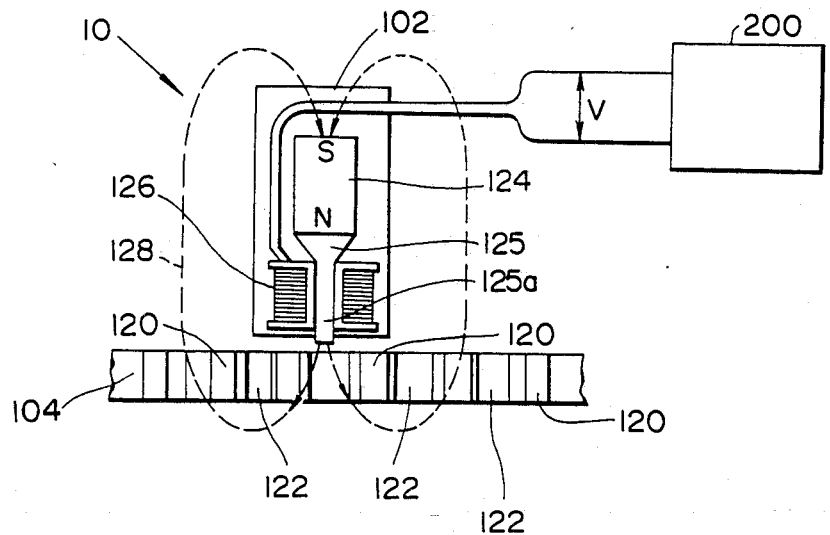
FIG. 9 is an explanatory illustration of the wheel speed sensors of FIGS. 7 and 8.
Figure 10:
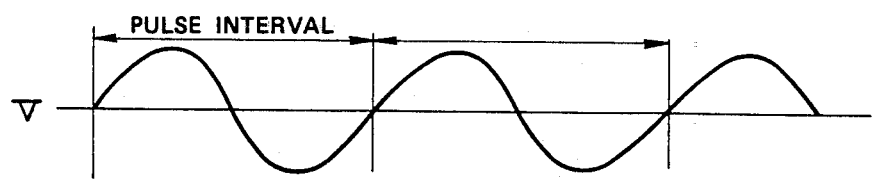
FIG. 10 shows the waveform of an alternating current sensor signal produced by the wheel speed sensor.

As shown in FIG. 9, the sensor rotor 104 is formed with a plurality of sensor teeth 120 at regular angular intervals. The width of the teeth 120 and the grooves 122 therebetween are equal in the shown embodiment and define a unit angle of wheel rotation. The sensor assembly 102 comprises a magnetic core 124 aligned with its north pole (N) near the sensor rotor 104 and its south pole (S) distal from the sensor rotor. A metal element 125 with a smaller diameter section 125a is attached to the end of the magnetic core 124 nearer the sensor rotor. The free end of the metal element 125 faces the sensor teeth 120. An electromagnetic coil 126 encircles the smaller diameter section 125a of the metal element. The electromagnetic coil 126 is adapted to detect variations in the magnetic field generated by the magnetic core 124 to produce an alternating-current sensor signal as shown in FIG. 10. That is, the metal element and the magnetic core 124 form a kind of proximity switch which adjusts the magnitude of the magnetic field depending upon the distance between the free end of the metal element 125 and the sensor rotor surface. Thus, the intensity of the magnetic field fluctuates in relation to the passage of the sensor teeth 120 and accordingly in relation to the angular velocity of the wheel.

It should be appreciated that the wheel speed sensor 12 for the right front wheel has the substantially the same structure as the set forth above. Therefore, explanation of the structure of the right wheel speed sensor 12 will be omitted in order to avoid unnecessary repetition in the disclosure and in order to simplify the description.

Figure 8:
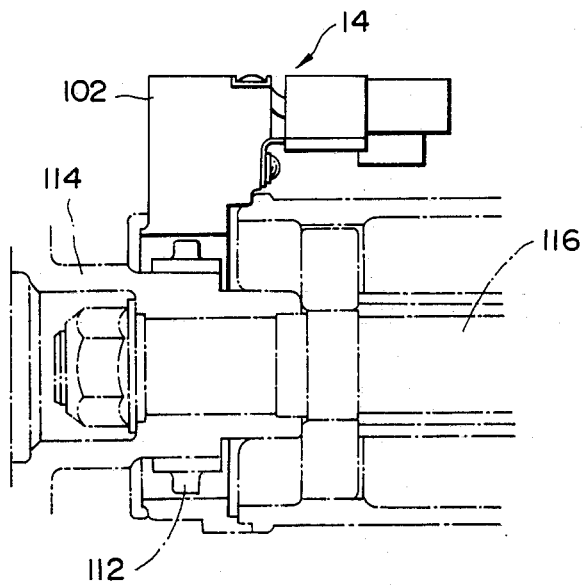
FIG. 8 is a side elevation of a wheel speed sensor adapted to detect the speed of a rear wheel.

FIG. 8 shows the structure of the rear wheel speed sensor 14. As with the aforementioned left front wheel speed sensor 10, the rear wheel speed sensor 14 comprises a sensor rotor 112 and a sensor assembly 102. The sensor rotor 112 is associated with a companion flange 114 which is, in turn, rigidly secured to a drive shaft 116 for rotation therewith. Thus, the sensor rotor 112 rotates with the drive shaft 116. The sensor assembly 102 is fixed to a final drive housing or a differential gear box (not shown).

Each of the sensor assemblies applied to the left and right front wheel speed sensors and the rear wheel sensor is adapted to output an alternating-current sensor signal having a frequency proportional to or corresponding to the rotational speed of the corresponding vehicle wheel. The electromagnetic coil 126 of each of the sensor assemblies 102 is connected to the control module 200 to supply the sensor signals thereto.

As set forth above, the control module 200 comprises the controller unit (FL) 202, the controller unit (FR) 204 and the controller unit (R) 206, each of which comprises a microcomputer. Therefore, the wheel speed sensors 10, 12 and 14 are connected to corresponding controller units 202, 204 and 206 and send their sensor signals thereto. Since the structure and operation of each of the controller units is substantially the same as that of the others, the structure and operation of only the controller unit 202 for performing the anti-skid brake control for the front left wheel cylinder will be explained in detail.

Figure 11:
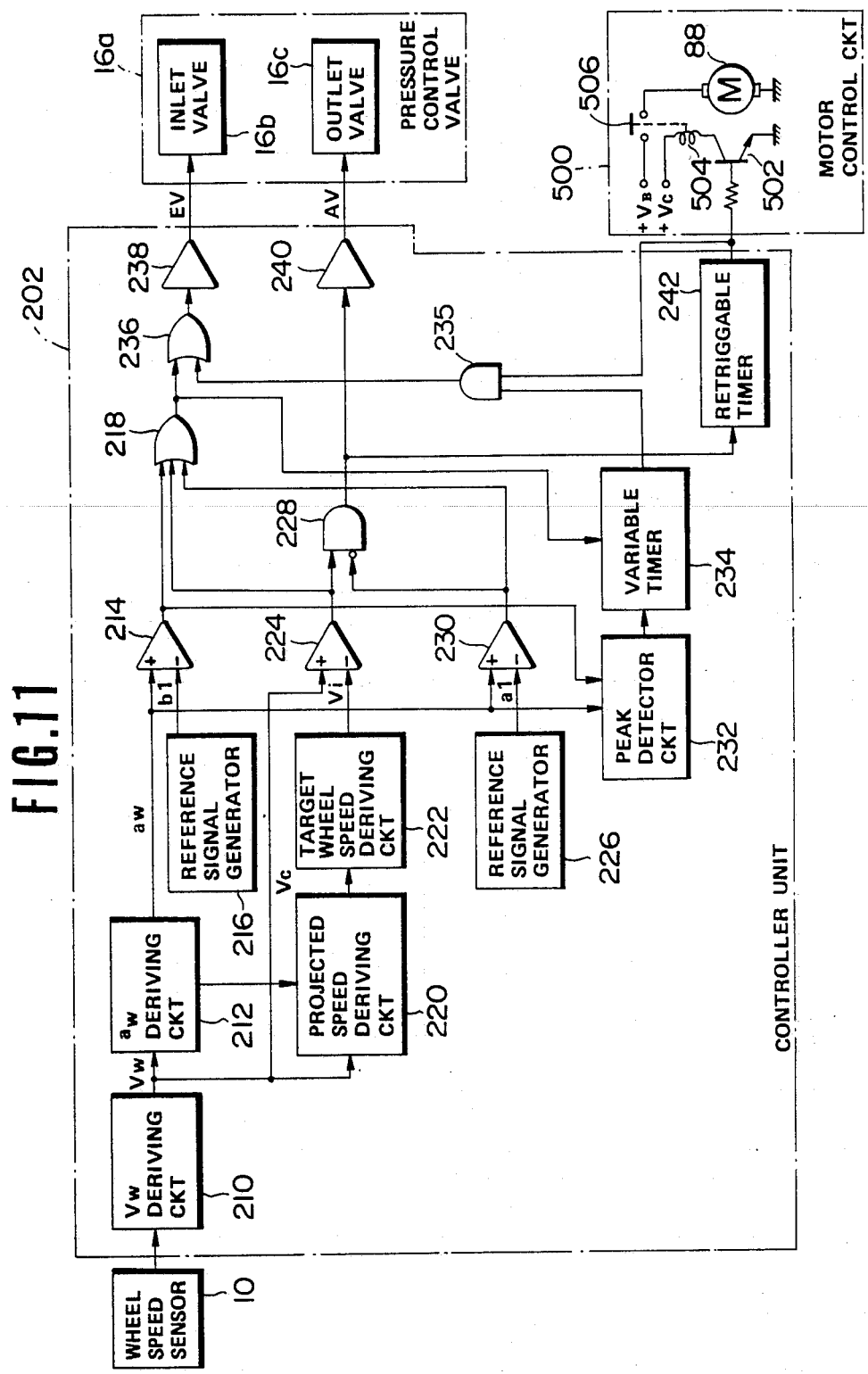
FIG. 11 is a block diagram of the first embodiment of a controller unit in the anti-skid brake control system according to the present invention.

FIG. 11 shows the first embodiment of controller unit 202 of the present invention. The controller units 204 and 206 are designed in substantially the same way as the controller unit described herebelow. Therefore, in order to simplify the disclosure, the detailed explanation of the controller units 204 and 206 will be omitted.

In FIG. 11, a wheel speed deriving circuit 210 is connected to the wheel speed sensor 10 to receive wheel speed indicative signals. The wheel speed deriving circuit 210 is adapted to output a wheel speed indicative signal having a value proportional to the pulse frequency of the wheel speed sensor signal from the wheel speed sensor. The wheel speed indicative signal is supplied to an acceleration deriving circuit 212. The wheel acceleration deriving circuit 212 differentiates the wheel speed indicative signal value to derive wheel acceleration value $a_w$ and outputs a wheel acceleration indicative signal. The wheel acceleration indicative signal is input to the positive input terminal of a differential amplifier 214. The negative input terminal of the differential amplifier 214 is connected to a reference signal generator 216 to receive a reference signal. The reference signal value is representative of a preset deceleration value, e.g. −1 G. Therefore, as long as the wheel acceleration indicative signal value is greater than the preset deceleration value, the output level of the differential amplifier remains LOW. On the other hand, when the wheel acceleration indicative signal value becomes less than the preset deceleration value, output level of the differential amplifier 214 goes HIGH. The output of the differential amplifier 214 is supplied to one of the three input terminals of an OR gate 218.

The wheel speed deriving circuit 210 is also connected to a projected speed deriving circuit 220. The projected speed deriving circuit is also connected to the wheel acceleration deriving circuit 212 to receive the wheel acceleration indicative signal. The projected speed deriving circuit 220 is adapted to latch the wheel speed indicative signal value when the wheel acceleration indicative signal value becomes equal to or greater than the preset deceleration value. The projected speed deriving circuit 220 includes memories for storing latched wheel speed indicative signal values of the current skid cycle and the immediately preceding skid cycle. In addition, the projected speed deriving circuit measures the interval between occurrences of latching of the wheel speed indicative signal values and from the measured period of time, the projected speed deriving circuit derives an average angular deceleration value. This deceleration value may used to derive a projected speed value for the next cycle of anti-skid control. For instance, each instantaneous projected speed may be derived by the following equation:

$$V_c = V_{wnew} + dV_w \times t$$

where $V_c$ is the projected speed;

$V_{wnew}$ is the wheel spaced at which the wheel acceleration indicative signal value equal to or less than the preset deceleration value is obtained;

$dV_w$ is the derived deceleration value; and t is elapsed time since deviation of the value $V_{wnew}$.

The projected speed $V_c$ represents an estimated vehicle speed based on the measured wheel speed. The vehicle speed can be obtained directly from the wheel speed whenever zero slip can be assumed. Therefore, in the embodiment shown, it is assumed that, when the preset deceleration value, e.g. −1 G, is obtained, wheel slip relative to the vehicle ground speed will be zero or negligible and so can ignored. The timing at which the wheel acceleration value becomes equal to or less than the preset deceleration value is thus regarded as cripping point for increasing wheel slippage relative to vehicle from zero by further decelerating operation.

In addition, it should be appreciated that, in the first cycle of anti-skid control, a fixed value, e.g. −0.4 G will be used as the deceleration value.

Procedures for deriving the projected speed can also be seen in the U.S. Pat. Nos. 4,392,202, issued July 5, 1983; 4,384,330, issued May 17, 1983; and 4,430,714 issued Feb. 7, 1984, respectively to the inventor of this invention and commonly assigned to the assignee of this invention. Disclosure of the above-identified U.S. Patents are herewith incorporated by reference for the sake of disclosure.

Returning to FIG. 11, the projected speed deriving circuit 220 is connected to a target wheel speed deriving circuit 222. The target wheel speed deriving circuit 222 is adapted to derive a target wheel speed which is optimally related to the vehicle speed. The target wheel speed means a wheel speed to which the wheel speed is to be adjusted in order to obtain optimal braking characteristics. In general, as is well known, braking characteristics are optimized when wheel slippage relative to the vehicle speed is in the range of 15% to 20%. Therefore, according to the preferred embodiment of the invention, the target wheel speed is chosen to be 85% of the projected vehicle speed. The target wheel speed deriving circuit 222 thus outputs a target wheel speed indicative signal having a value corresponding to 85% of the projected speed.

The target wheel speed deriving circuit 222 is connected to the negative input terminal of a differential amplifier 224. The positive input terminal of the differential amplifier is connected to the wheel speed deriving circuit 210. The differential amplifier 224 compares the wheel speed indicative signal value with the target wheel speed indicative signal value and outputs a HIGH-level comparator signal as long as the wheel speed indicative signal value is less than the target wheel indicative signal value. On the other hand, the output level of the differential amplifier goes LOW when the wheel speed indicative signal value becomes greater than the target wheel speed indicative signal value. The output terminal of the differential amplifier 224 is connected to an AND gate 228 to supply the comparator output thereto.

The wheel acceleration deriving circuit 212 is also connected to the positive terminal of a differential amplifier 230. The negative input terminal of the differential amplifier 230 is connected to a reference signal generator 226. The reference signal generator 226 outputs a reference signal having a value representative of a preset acceleration value, e.g. 0.6 G. The differential amplifier 230 outputs a HIGH-level signal when the wheel acceleration indicative signal value is greater than the reference signal value, and, conversely, a LOW-level signal when the wheel acceleration indicative signal value is less than the reference signal value.

A peak detector circuit 232 also receives the wheel acceleration and deceleration indicative signal value from the wheel acceleration deriving circuit 212. The peak detector circuit 232 latches the peak value of the wheel acceleration indicative signal. The peak detector circuit 232 outputs a peak value indicative signal, the value of which is representative of the latched peak value of wheel acceleration. The peak value indicative signal is sent to a variable timer 234. The variable timer 234 is also connected to the output terminal of the OR gate 218. The variable timer 234 is responsive to a change in the output of the OR gate 218 from HIGH level to LOW level to be triggered for a period of time corresponding to the value of the peak value indicative signal.

A peak detector circuit 232 also receives the wheel acceleration and deceleration indicative signal value from the wheel acceleration deriving circuit 212. The peak detector circuit 232 latches the peak value $a_{max}$ of the wheel acceleration indicative signal. The peak detector circuit 232 outputs a peak value indicative signal, value of which is representative of the latched peak value of wheel acceleration. The peak value indicative signal is sent to a variable time 234. The variable timer is also connected to the output terminal of the OR gate 218. The variable timer is responsive to change in the output of the OR gate 218 from HIGH level to LOW level to be triggered. The variable timer 234, as triggered, outputs a train of pulse form signals with a constant intervals. Pulse width of the variable timer signal is variable depending upon the peak value indicated in the peak value indicative signal from the peak detector circuit 232.

The variable timer 234 is connected to one input terminal of an AND gate 235. The other input terminal of the AND gate 235 is connected to a retriggable timer 242 for controlling a motor control circuit 500, which are to be described later. The AND gate 235 is connected to the OR gate 236 which is, in turn, connected to the OR gate 218 at one of the input terminals.

The OR gate 218 is connected to the output terminal of the three differential amplifiers 214, 224 and 230. The differential amplifier 214 outputs a HIGH-level comparator signal when the wheel acceleration indicative signal value is less than the preset deceleration value. The preset deceleration value represents a pressure release threshold. Therefore, a HIGH-level output from comparator 214 indicates deceleration of the wheel beyond the pressure release threshold. The differential amplifier 230 outputs a HIGH-level comparator signal when the wheel acceleration indicative signal value is greater than the preset acceleration value. The preset acceleration value is representative of a pressure apply threshold. Therefore, a HIGH-level signal from comparator 230 indicates acceleration of the wheel beyond the pressure apply threshold. On the other hand, the differential amplifier 224 outputs a HIGH-level comparator signal when the wheel speed value is less than the target wheel speed value. Therefore, the output of the OR gate 218 is HIGH when wheel acceleration is less than the preset deceleration value or greater than the preset acceleration value, or when the wheel speed is less than the target wheel speed.

The output of the OR gate 218 is supplied to one input terminal of the OR gate 236. In addition, the output of OR gate 218 is supplied to the variable timer. As set forth above, the variable timer responds to change in the gate signal level from HIGH to LOW by outputting a HIGH-level timer signal for a given period of time derived according to the peak value of the wheel acceleration to the OR gate 236. The OR gate 236 transmits the HIGH-level output to an amplifier 238 which in turn supplies an amplifier output to the inlet valve as an inlet signal EV.

The differential amplifier 224 is also connected for output to an AND gate 228. In addition, the differential amplifier 230 is connected to an inverting input terminal of the AND gate 228. The differential amplifier 224 outputs a HIGH-level comparator signal when wheel speed is less than the target wheel speed, the differential amplifier 230 outputs a LOW-level comparator signal when the wheel acceleration value is smaller the preset acceleration value, and the AND gate 228 outputs a HIGH-level gate signal only when both of these conditions are satisfied. Otherwise, the output level of the AND gate 228 remains LOW. The AND gate is connected for output to an amplifier 240 which in turn sends an amplifier signal to outlet valve as an outlet signal AV.

The AND gate 228 is also connected to the retriggable timer 242. The retriggable timer 242 is responsive to a HIGH-level output from the AND gate 228 to be triggered for a period of time longer than the maximum duration of one cycle of skid control. The retriggable timer 242 is connected for output to the base electrode of a switching transistor 502 in the motor control circuit 500 which controls operation of the motor 88 of the fluid pump 90. The transistor 502 is rendered conductive by the HIGH-level trigger signal from the retriggable timer 242 to energize a relay coil 504 connected to collector electrode thereof. A relay switch 506 is turned ON by energization of the relay coil 504 to close a power supply circuit for the motor 88. Therefore, the motor 88 is driven for the period of time for which the retriggable timer 242 is triggered.

Figure 12:
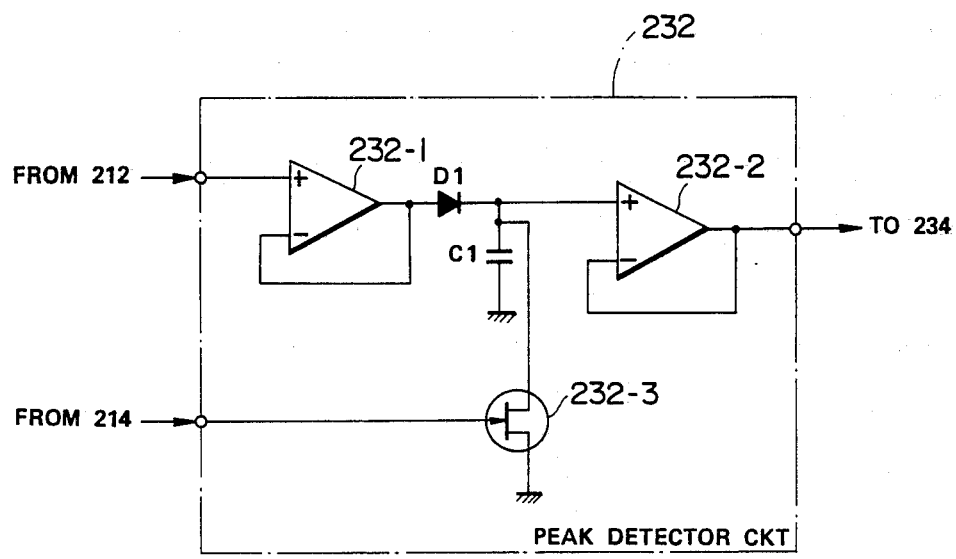
FIG. 12 is a circuit diagram of a peak detector circuit in the first embodiment of the controller unit of FIG. 11.

FIG. 12 shows details of the peak detector circuit 232. The peak detector circuit 232 comprises a buffer-/amplifier circuit including two operational amplifiers 232-1 and 232-2, a peak-hold circuit including a diode $D_1$ and a capacitor $C_1$ and a reset circuit including a field-effect transistor 232-3. The positive input terminal of the OP amp 232-1 is connected to the wheel acceleration deriving circuit 212 to receive the wheel acceleration indicative signal. The output terminal of the OP amp 232-1 is connected to the positive input terminal of the OP amp 232-2 via the diode $D_1$. The output terminal of the OP amp 232-1 is also connected to its own negative input terminal. The capacitor $C_1$ is connected between the diode $D_1$ and ground in parallel with OP amp 232-2. Therefore, the capacitor $C_1$ is charged to the maximum value of the wheel acceleration indicative signal. In addition, the diode-side terminal of capacitor $C_1$ is connected to the field-effect transistor 232-3 which acts as a switching element. The gate of the field-effect transistor 232-3 is connected to the differential amplifier 214. The field-effect transistor 232-3 is turned OFF while the output of the differential amplifier 214 is LOW, thus allowing the capacitor to be charged to hold the peak value of wheel acceleration. The charge level of the capacitor $C_1$ approximately corresponds to but is slightly lower than the peak wheel acceleration indicative signal value due to the drop of charge level through the diode.

Figure 13:
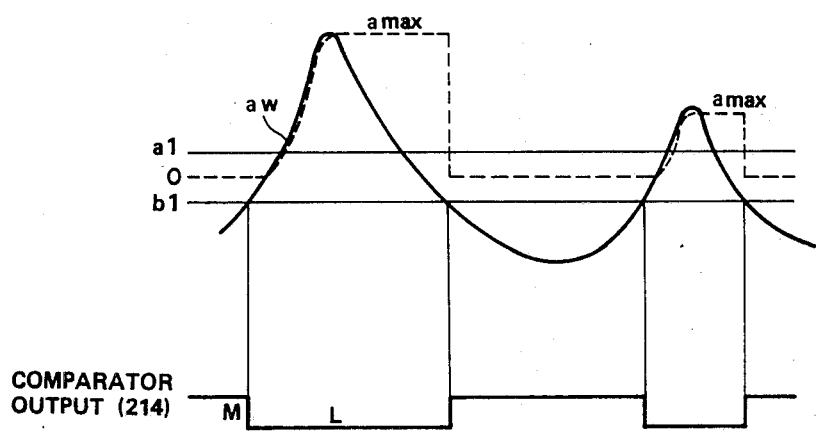
FIG. 13 is a timing chart of an output of a comparator 214 in the controller unit of FIG. 11.

As shown in FIG. 13, since the output level of differential amplifier 214 remains LOW while the wheel acceleration indicative signal value is greater than the preset deceleration value $b_1$, the capacitor $C_1$ can be charged as illustrated in broken lines. The charge on the capacitor $C_1$ increases with the wheel acceleration indicative signal value to its peak. The peak value $a_{max}$ is held by the capacitor until the differential amplifier output level turns HIGH level. When the wheel speed drops at a rate lower than the preset deceleration value $b_1$, the differential amplifier 214 outputs a HIGH-level comparator signal to turn on the field-effect transistor 232-3 which discharges the capacitor $C_1$.

The charge on the capacitor is transmitted to the variable timer 234 via the buffer-amplifier 232-2.

Figure 14:
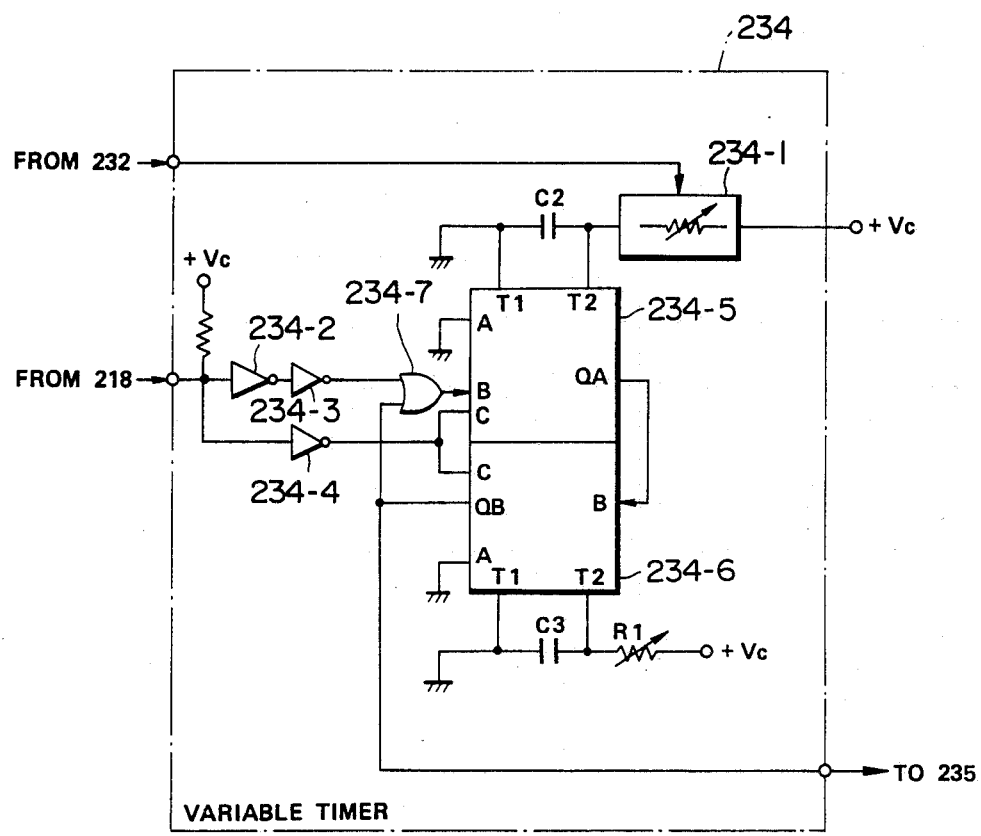
FIG. 14 is a circuit diagram of a variable timer in the first embodiment of the controller of FIG. 11.

FIG. 14 shows the interval circuitry of the variable timer 234. The variable timer 234 includes first and second timers 234-5 and 234-6. In the shown embodiment, the timers 234-5 and 234-6 are actually commercially available IC's HD14538B, by Hitachi Ltd. Each timer 234-5 and 234-6 has terminals $T_1$ and $T_2$ connected to a time-constant circuit, including a resistor and a capacitor, which determines the time constant of the timer. In practice, the terminals $T_1$ and $T_2$ of the first timer 234-5 is connected to a capacitor $C_2$ and a variable resistor circuit 234-1 which is, in turn, connected to the peak detector circuit 232. On the other hand, the terminals $T_1$ and $T_2$ of the second timer 234-6 are connected to the capacitor $C_3$ and a variable resistor $R_1$.

The first timer 234-5 has a terminal B connected to the OR gate 218 via inverters 234-2 and 234-3 and an OR gate 234-7. The OR gate 234-7 is also connected to the output terminal QB of the second timer 234-6. The input from the OR gate 218 is also applied to the terminals C of both of the timers 234-5 and 234-6. The timers 234-5 and 234-6 are active as long as HIGH level input is applied to the terminals C. In other words, the timers 234-5 and 234-6 remains active as long as the input output level of the OR gate 218 is held LOW. As soon as the input level at the terminals C, the timers 234-5 and 234-6 becomes inoperative.

The output terminal QA of the first timer 234-5 is connected to the terminal B of the second timer 234-6. The output terminal QB of the second timer 234-6 is connected to the terminal B of the first timer 234-5 through the OR gate 234-7 as set forth above and, in turn, to the AND gate 235.

The first and second timers 234-5 and 234-6 respectively provided time constants which durations to keep the output level at the output terminals QB thereof HIGH. For instance, the first timer 234-5 is responsive to HIGH level input at the terminal B thereof to a output HIGH level output for a period of time define by the time constant which is provided by the variable resistor 234-1. On the other hand, the second timer 235-6 outputs a HIGH level output for a period of time $T_2$ defined by the capacitor $C_3$ and variable resistor $R_1$ when the input level at the terminal B changes from HIGH to LOW.

Figure 15:
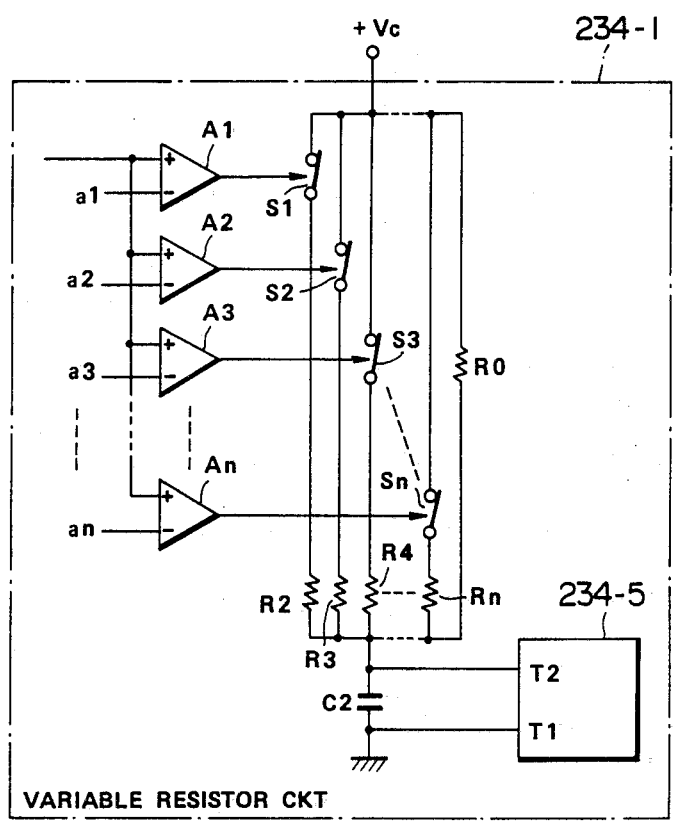
FIG. 15 is a schematic circuit diagram of a variable resistor in the variable timer of FIG. 14.

The variable resistor 234-1 has been illustrated in detail in FIG. 15. The variable resistor 234-1 includes a plurality of differential amplifier $A_1, A_2, A_3 \ldots A_n$, each of which has a positive input terminal connected to the peak detector circuit 232. Corresponding, unique reference value indicative signals $a_1, a_2, a_3 \ldots a_n$ are applied to the negative input terminals of each of the differential amplifiers $A_1, A_2, A_3 \ldots A_n$. In the embodiment shown, the reference values $a_1, a_2, a_3 \ldots a_n$ are gradually increased in order. Each of the differential amplifiers $A_1, A_2, A_3 \ldots A_n$ is associated with a switch $S_1, S_2, S_3 \ldots S_n$. The switches $S_1, S_2, S_3 \ldots S_n$ are each connected in series to a corresponding, unique resistor $R_2, R_3, R_4 \ldots R_n$. The switches $S_1, S_2, S_3 \ldots S_n$ are adapted to be turned OFF in response to HIGH-level signals from the corresponding differential amplifiers $A_1, A_2, A_3 \ldots A_n$. The resistance values of the resistors $R_1, R_2, R_3 \ldots R_n$ are arranged in order to increasing resistance.

In the arrangement set forth above, some of the switches $S_1, S_2, S_3 \ldots S_n$ are open depending upon the peak value of the wheel acceleration. The net resistance value of the circuit, determined by which of the switches $S_1, S_2, S_3 \ldots S_n$ are open or closed, determines in turn the voltage applied to the capacitor $C_2$ and so the time constant of the first timer 234-5.

Therefore, the variable timer 234 is responsive to the output from the OR gate 218. When the output of OR gate 218 changes from a HIGH level to a LOW level, the input at the terminals C of the first and second timers 234-5 and 234-6 goes HIGH. By the leading edge of the HIGH level inputs, the first and second timers 234-5 and 234-6 become active. In response to the starting of the operation, the first timer 234-5 outputs a HIGH level output through the output terminal QA. The HIGH level output at the terminal QA is maintained for a period of time $T_1$ determined corresponding to the time constant of the first timer, which is, in turn, defined by the resistance of the variable resistor 234-1 derived on the basis of the peak value indicative signal from the peak detector circuit 232. During this period $T_1$, the output level at the output terminal QB of the second timer 234-6 is held LOW. After expiration of the period of time $T_1$ determined depending upon the time constant of the first timer 234-5, the input level at the terminal B of the second timer 234-6 turns LOW via the dropping of the output level at the output terminal QA of the first timer 234-5 from a HIGH to LOW. By this, the second timer 234-6 starts to output HIGH level output through the output terminal QB. HIGH level output at the output terminal QB is maintained for a period of time $T_2$ which is determined by a time constant provided for the second timer. In this embodiment, the time constant of the second timer 234-6 is constant. Therefore, the period of time $T_2$ in which the output level at the output terminal QB is held HIGH, is constant.

This HIGH level output at the terminal QB is fedback to the input terminal B of the first timer 234-5. As a result, the first timer 234-5 is held inoperative for the period of time $T_2$. After expiring of the period of time $T_2$, the first timer 234-5 become active in response to the trailing edge of the HIGH level input at the input terminal B through the OR gate 234-7.

Figure 16:
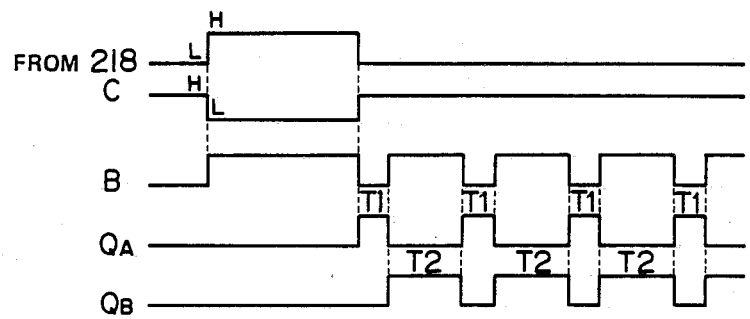
FIG. 16 is a timing chart showing operation of the variable timer of FIG. 14.
Figure 17:
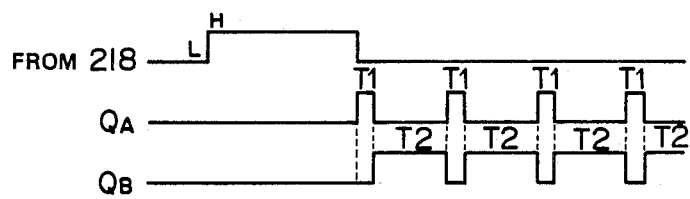
FIG. 17 is also a timing chart showing operation of the variable timer of FIG. 14, in which duration for holding APPLICATION mode is shorter than that illustrated in FIG. 16.

As a result, the variable timer outputs pulse form timer signals having a duration of a HIGH level component variable depending upon the resistance value of the variable resistor 234-1, as shown in FIGS. 16 and 17. It would be appreciated in FIGS. 16 and 17, the time constant of the first timer 234-5 in the case of FIG. 16 is longer than that in the case of FIG. 17. The time constant of the first timer 234-5 may be varied in accordance with the characteristics shown in FIG. 18. As will be appreciated herefrom, the time constant value is proportional to the peak value indicative signal value.

Figure 19:
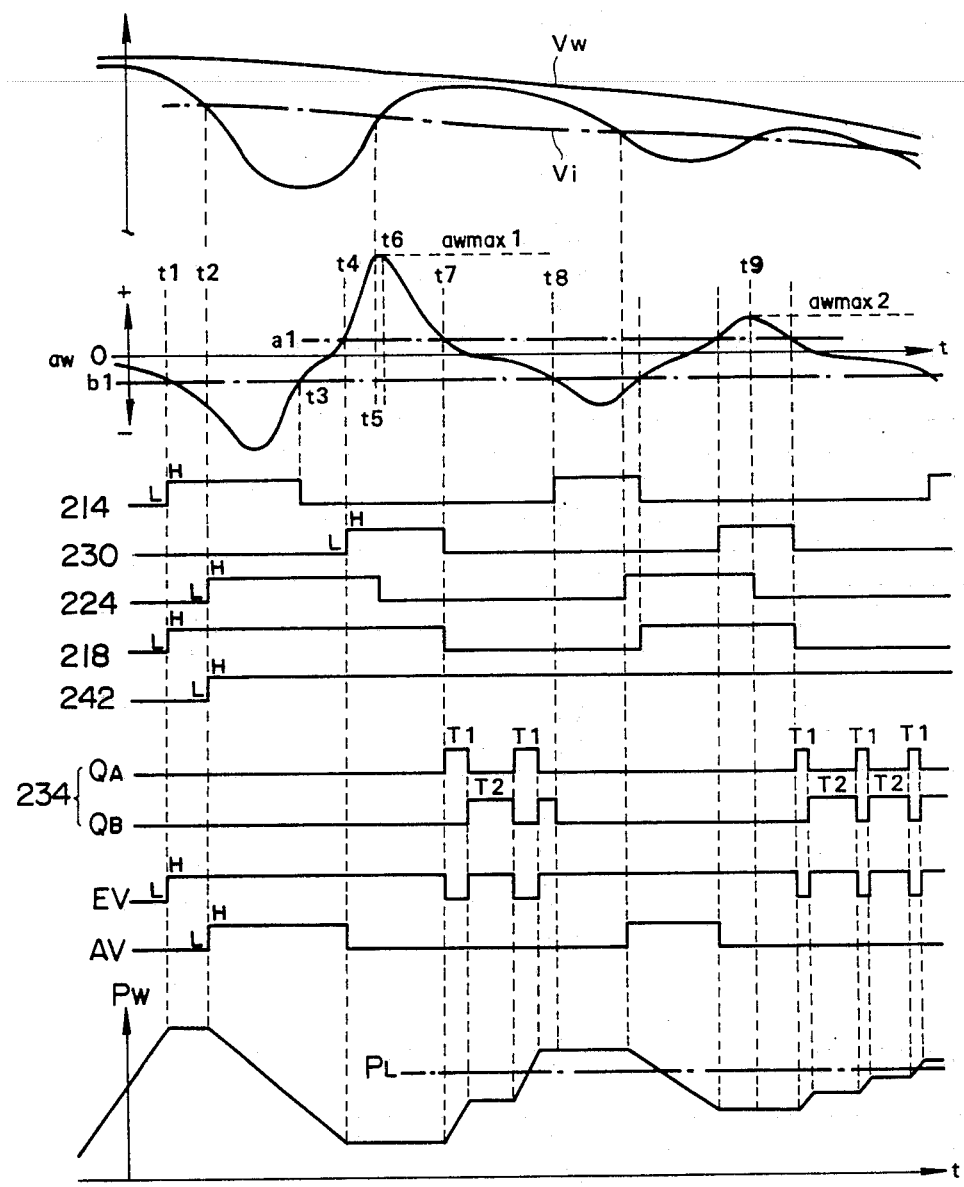
FIG. 19 is a timing chart showing operation of the overall system of the first embodiment of controller unit of FIG. 11.

The overall operation of the first embodiment of the anti-skid brake control system as set forth above, will be described with reference to FIG. 19.

After starting application of the brakes, the wheel decelerates, i.e. the deceleration value increases. At a time $t_1$, the wheel deceleration $a_w$ becomes less than the preset deceleration value $b_1$. Therefore, the output level of the differential amplifier 214 goes from a LOW level to HIGH level. The HIGH level comparator signal of the differential amplifier 214 is output to the OR gate 218.

At this time, as the wheel acceleration value $a_w$ is less than the present acceleration value $a_1$, the output level of the differential amplifier 230 remains LOW. Also, as the wheel speed $V_w$ is higher than the target wheel speed $V_i$, the output level of the differential amplifier 224 remains LOW.

Therefore, the output of the OR gate 218 goes HIGH and the output of the AND gate 228 goes LOW. Thus, the output of the OR gate 236 goes HIGH, thus transmitting a HIGH-level inlet signal EV to the inlet valve 16b through the amplifier 238. On the other hand, since the output level of the AND gate 228 remains LOW, a LOW-level outlet signal AV is transmitted to the outlet valve 16c via the amplifier 240.

In the embodiment shown, the pressure control valve 16a including the inlet valve 16b and the outlet valve 16c operates in different operational modes as set out below:

| Operation Mode | EV | AV |
| --- | --- | --- |
| APPLICATION MODE | LOW | LOW |
| HOLD MODE | HIGH | LOW |
| RELEASE MODE | HIGH | HIGH |

Therefore, at the time $t_1$, the pressure control valve 16a is actuated to the HOLD mode in which the fluid pressure to be applied to the wheel cylinder is held at the pressure level at time $t_1$. As a result, the wheel continues to decelerate and drops below the target wheel speed $V_i$ at a time $t_2$. As a result, the output of the differential amplifier 224 goes HIGH at the time $t_2$. Since the output level of the differential amplifier 230 still remains LOW, the input level of the AND gate 228 from the differential amplifier 230 is HIGH. Thus, the AND gate 228 is opened to transmit a HIGH-level outlet signal AV to the outlet valve 16c via the amplifier 240. At this time, the inlet signal EV remains HIGH. Therefore, at the time $t_2$, the operation mode of the pressure control valve 16a changes to the RELEASE mode.

In response to the rising edge of the outlet signal AV, the retriggable timer 242 is triggered to energize the relay coil 504 to turn ON the relay switch 506 to drive the motor 88 of the pressure reduction fluid pump 90. The fluid pump 90 assists reduction of the fluid pressure in the wheel cylinder.

By actuating the pressure control valve 16a to the RELEASE mode, the wheel speed is allowed to increase again. As a result, the wheel acceleration $a_w$ gradually increases and exceeds the preset deceleration value $b_1$ at a time $t_3$. Whereupon the output level of the differential amplifier 214 goes LOW. However, in this case, since the output level of the differential amplifier 224 still remains HIGH, the output of the OR gate 224 remains HIGH. Therefore, the RELEASE mode is maintained, allowing the wheel speed to increase further towards the vehicle speed. Wheel acceleration $a_w$ thus increases until it exceeds the preset acceleration value $a_1$ at a time $t_4$. As a result, the output level of the differential amplifier 230 goes HIGH at the time $t_4$. The OR gate 218 thus outputs a HIGH-level gate signal. On the other hand, as the input level of the AND gate 228 from the differential amplifier 230 goes LOW, the output level of the AND GATE 228 goes LOW. Therefore, operation returns to the HOLD mode in which the fluid pressure in the wheel cylinder is held at the current pressure level at the time $t_4$. Since the fluid pressure at the time $t_4$ is relatively low, wheel speed continues to increase toward the vehicle speed. The wheel speed thus exceeds the target wheel speed $V_i$ at a time $t_5$. Therefore, output level of the differential amplifier 224 turns to a LOW level at the time $t_5$. At this time, since the output level of the differential amplifier 230 is HIGH, the OR gate 218 still outputs a HIGH-level gate signal.

In accordance with the relatively high slip rate the rate of increase of the wheel speed is rather high at the time $t_2$ at which the system enters the RELEASE mode. As the wheel speed returned toward the vehicle speed, the slip rate gradually drops, as does the rate of increase of the wheel speed $V_w$. Wheel acceleration $a_w$ reaches a peak $a_{wmax1}$ at a time $t_6$. The peak value $a_{wmax1}$ is latched by the peak detector circuit 232.

After the time $t_6$, wheel acceleration quickly drops below the preset acceleration value $a_1$ at a time $t_7$. At this time, the output level of the differential amplifier 230 goes LOW. Since the wheel speed $V_w$ is still higher than the target wheel speed, the output level of the differential amplifier 224 is also LOW. In addition, since the wheel acceleration $a_w$ is greater than the preset deceleration value $b_1$, the output level of the differential amplifier 214 is also LOW. Thus, the output level of the OR gate 218 goes LOW.

In response to the trailing edge of the HIGH level gate signal of the OR gate 218, the variable timer 234 becomes active. As set forth above, the output level at the output terminal of the first timer 234-5 turns HIGH and LOW alternatively and the HIGH level outputs are maintained for the period $T_1$ as defined by the resistance of the variable timer and proportional to the peak value $a_{wmax1}$ of wheel acceleration as latched at the time $t_6$. As a result, the timer output is in a form of pulse having pulse interval $T_1$ corresponding to the duration for which the first timer outputs a HIGH level output through the output terminal QA. The pulse width of the pulse form timer signal is held constant and corresponding to the timer constant $T_2$ of the second timer.

By the input from the variable timer, signal level of the EV signal changes alternatively between HIGH and LOW. While the timer signal is held LOW, the EV signal is held low to increase fluid pressure in the wheel cylinder in the APPLICATION mode. On the other hand, while the timer signal is held HIGH, the EV signal remains HIGH to keep the fluid pressure in the actuator constant in the HOLD mode. Therefore, the pressure control valve performs the APPLICATION mode and the HOLD mode alternatively to increase the fluid pressure in the wheel cylinder in a stepwise fashion.

At this time, since the period of time in which the pressure control valve is maintained in the APPLICATION mode is variable proportional to the peak value, increasing the average rate of the fluid pressure in the wheel cylinder is variable corresponding to the wheel accelerating condition.

By increasing the fluid pressure in the wheel cylinder is a stepwise fashion as set forth above, the wheel speed is decreased so that the wheel deceleration becomes greater than the preset deceleration valve $b_1$, at a time $t_8$. By this, the differential amplifier 214 outputs a HIGH level comparator signal to change the operation mode back to HOLD mode, as the status of the wheel is very similar to that at the time $t_1$. Therefore, the second cycle of skid control operation starts at the time $t_8$. The second skid cycle progresses very similar to the first cycle of skid control operation.

During the second cycle of skid control operation, the second peak value $a_{wmax2}$ is latched by the peak detector circuit 232. The variable timer 234 thus outputs the pulse form timer signal having the pulse intervals proportional to the latched peak value $a_{wmax2}$. As will be apparent from FIG. 19, since the latched peak value at the time $t_9$ is smaller than the peak value $a_{wmax1}$ as latched in the first skid cycle, the pulse interval $T_1$ of the timer signal becomes smaller. This decreases a rate of time to keep the pressure control valve in the APPLICATION mode decreases the average increasing rate of fluid pressure in the wheel cylinder.

By this relatively moderate increase of the fluid pressure in the second cycle where the peak value of wheel acceleration is much smaller than that in the first cycle, the duration through which the brake pressure is held nearby the lock pressure is prolongated. On the other hand, by providing relatively large increasing rates of the brake pressure during the period in which wheel acceleration peak is relatively high to reach the lock pressure quickly the response characteristics of the braking operation at the initial stage of the braking operation is improved.

Figure 20:
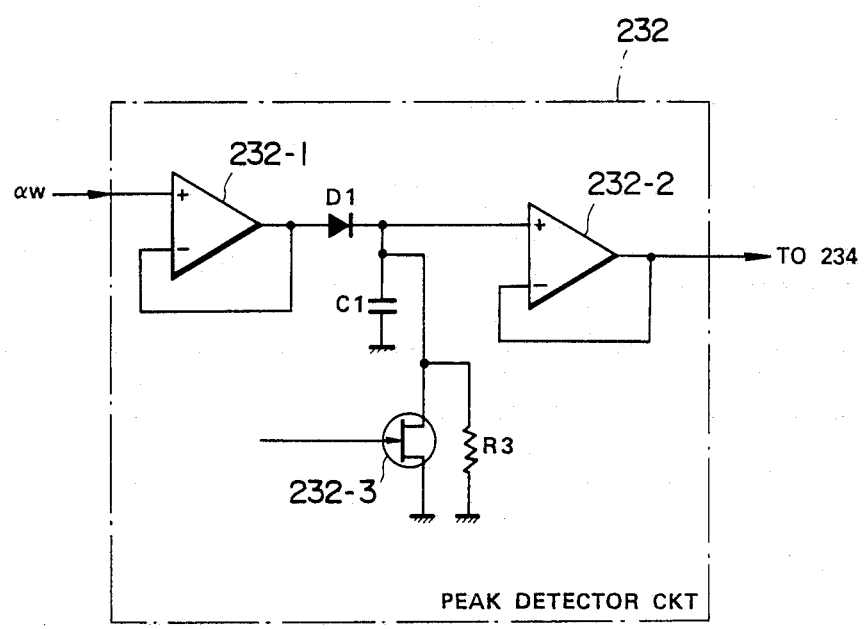
FIG. 20 is a circuit diagram of a modification of the variable timer of FIG. 14.

FIG. 20 shows a modification of the peak detector circuit 232 of FIG. 12. In this modification, a resistor $R_3$ is provided in parallel relationship to the OP amp 232-1.

Figure 21:
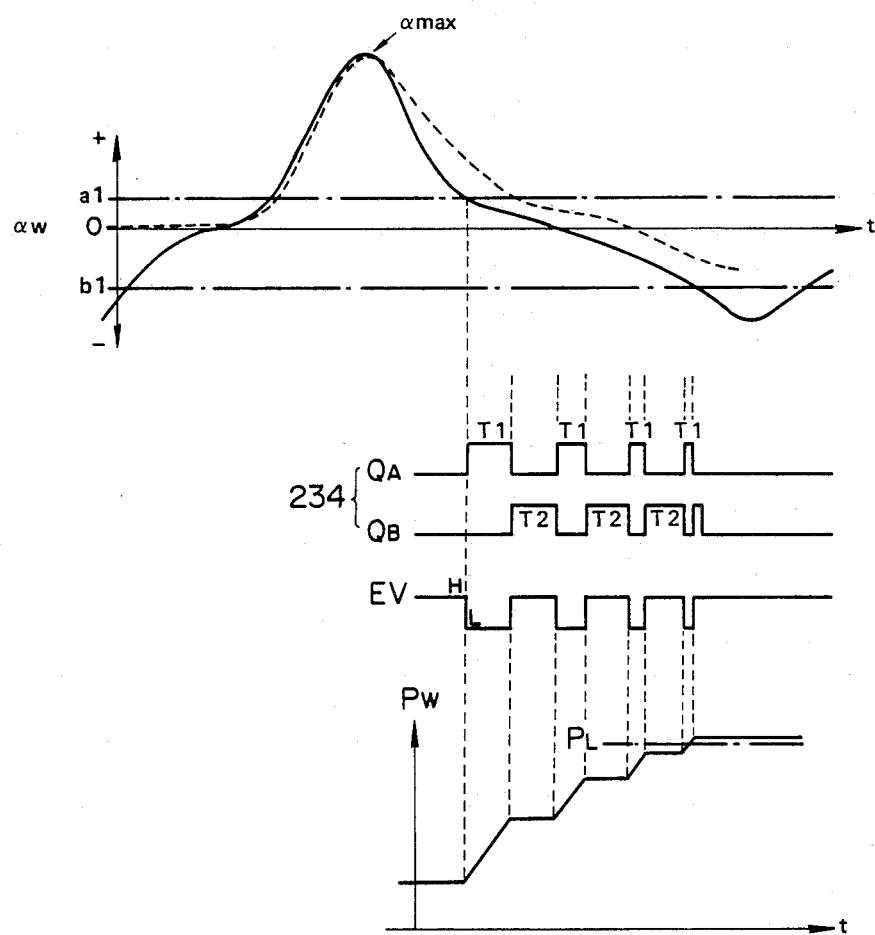
FIG. 21 is a timing chart showing operation of the controller unit employing the variable timer of FIG. 20.

By providing the resistor $R_3$, the signal value of the peak value indicative signal decreases at a rate determined by a discharge time constant determined by the capacity of the capacitor $C_1$ and the resistance of the resistor $R_3$. Therefore, input level at the variable resistor 234-1 varies to gradually decrease, as shown by broken line in FIG. 21. As a result, the duration of HIGH level component of the pulse form output at the output terminal QA of the first timer 234-5 gradually decreases corresponding to decreasing of the peak value indicative signal value. This gradually shortens the duration to keep the pressure control valve in the APPLICATION mode. This would help for prolongation of period of time to keep the brake pressure nearby the lock pressure.

FIGS. 22 to 33 show another embodiment of the anti-skid brake control system according to the present invention. In this embodiment, the present invention is applied to a microprocessor-based digital control system. In order to make the alternating-current wheel sensor signal applicable to the digital control system, the sensor signal is converted into a train of pulses separated by intervals corresponding to or representative of the detected peripheral speed of the wheel. Before explaining the embodiment shown, the theory of anti-skid brake control by means of the digital control system will be briefly described herebelow for the sake of better understanding of the invention.

The wheel rotation speed $V_w$ is calculated in response to each sensor pulse. As is well known, the wheel speed is generally inversely proportional to the intervals between the sensor pulses, and accordingly, the wheel speed $V_w$ is derived from the interval between the last sensor pulse input time and the current sensor pulse input time. A target wheel speed is designated $V_i$ and the resultant wheel speed is designated $V_w$. In addition, the slip rate is derived from the rate of change of the wheel speed and an projected speed $V_v$ which is estimated from the wheel speed at the moment the brakes are applied based on the assumption of a continuous, linear deceleration without slippage. In general, the target wheel speed $V_i$ is derived from the wheel speed of the last skid cycle during which the wheel deceleration value was equal to or less than a given value which will be hereafter referred to as "deceleration threshold $a_{ref}$", and the wheel speed of the current skid cycle, and by estimating the rate of change of the wheel speed between wheel speeds at which the rate of deceleration is equal to or less than the deceleration threshold. In practice, the first target wheel speed $V_i$ is derived based on the projected speed $V_v$ which corresponds to a wheel speed at the initial stage of braking operation and at which wheel deceleration exceeds a predetermined value, e.g. $-1.2$ G, and a predetermined deceleration value, for example 0.4 G. The subsequent target wheel speed $V_i$ is derived based on the projected speeds $V_v$ in last two skid cycles. For instance, the deceleration value of the target wheel speed $V_i$ is derived from a difference of the projected speeds $V_v$ in the last two skid cycle and a period of time in which wheel speed varies from the first projected speed to the next projected speed. Based on the last projected speed and the deceleration value, the target wheel speed in the current skid cycle is derived.

The acceleration of the wheel is derived based on input times of three successive sensor pulses. Since the interval of the adjacent sensor signal pulses corresponds to the wheel speed, and the wheel speed is a function of the reciprocal of the interval, by comparing adjacent pulse-to-pulse intervals, a value corresponding to the variation or difference of the wheel speed may be obtained. The resultant may be divided by the period of time in order to obtain the wheel acceleration at the unit time. Therefore, the acceleration or deceleration of the wheel is derived from the following equation:

$$a_w = \left( \frac{1}{C-B} - \frac{1}{B-A} \right) / \left( \frac{C-A}{2} \right) \quad (1)$$

where A, B and C are the input times of the sensor pulses in the order given.

On the other hand, the slip rate R is a rate of difference of wheel speed relative to the vehicle speed which is assumed as substantially corresponding to the target wheel speed. Therefore, in the shown embodiment, the target wheel speed $V_i$ is taken as variable or parameter indicative of the assumed or projected vehicle speed. The slip rate R can be obtained by dividing a difference between the target wheel speed $V_i$ and the instantaneous wheel speed $V_w$ by the target wheel speed. Therefore, in addition, the slip rate R is derived by solving the following equation:

$$R = \frac{V_i - V_w}{V_i} \quad (2)$$

Finally, the controller unit 202 determines the control mode, i.e., release mode, hold mode and application mode from the slip rate R and the wheel acceleration or deceleration $a_w$.

In anti-skid brake control, the braking force applied to the wheel cylinder is to be so adjusted that the peripheral speed of the wheel, i.e. the wheel speed, during braking is held to a given ratio, e.g. 85% to 80% of the vehicle speed. Therefore, the slip rate R has to be maintained below a given ratio, i.e., 15% to 20%. In the preferred embodiment, the control system controls the braking force so as to maintain the slip rate at about 15%. Therefore, a reference value $R_{ref}$ to be compared with the slip rate R is determined at a value at 85% of the projected speed $V_v$. As will be appreciated, the reference value is thus indicative of a slip rate threshold, which will be hereafter referred to "slip rate threshold $R_{ref}$" throughout the specification and claims, and varies according to variation of the target wheel speed.

Figure 4:
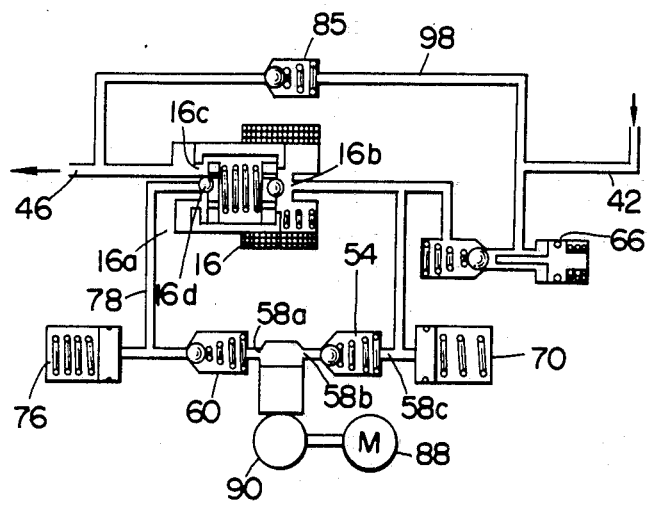
FIG. 4 is an illustration of the operation of an electromagnetic flow control valve employed in the hydraulic circuit, which valve has been shown in an application mode for increasing the fluid pressure in a wheel cylinder.
Figure 5:
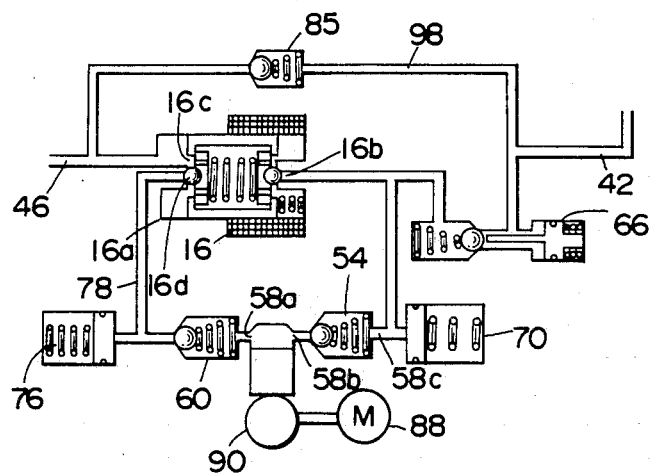
FIG. 5 is a view similar to FIG. 4 but of the valve in a hold mode in which the fluid pressure in the wheel cylinder is held at a substantially constant value.
Figure 6:
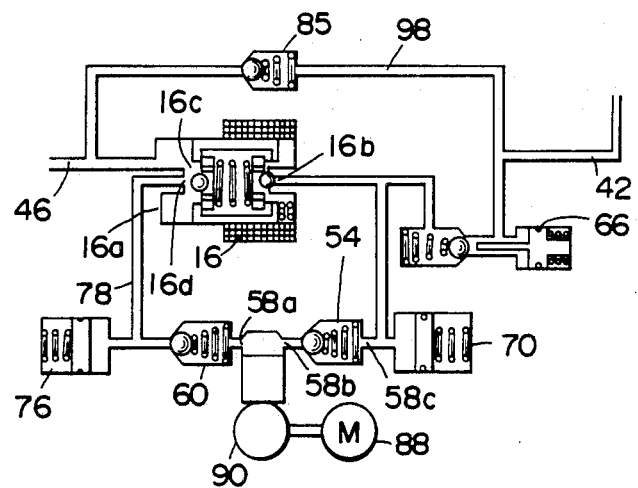
FIG. 6 is a view similar to FIG. 4 but of the valve in a release mode in which the fluid pressure in the wheel cylinder is reduced.

In practical brake control operation performed by the preferred embodiment of the anti-skid control system according to the present invention, the electric current applied to the actuator attains a limited value, e.g., 2A to place the electromagnetic valve 30a in the hold mode as shown in FIG. 5 when the wheel speed remains inbetween the target wheel speed $V_i$ and the slip rate threshold $R_{ref}$. When the slip rate derived from the target wheel speed $V_i$ and the wheel speed $V_w$ becomes equal to or greater than the slip rate threshold $R_{ref}$, then the supply current to the actuator 16 is increased to a maximum value, e.g. 5A to place the electromagnetic valve in the release mode as shown in FIG. 6. By maintaining the release mode, the wheel speed $V_w$ is recovered to the target wheel speed. When the wheel speed is thus recovered or resumed so that the slip rate R at that wheel speed becomes equal to or less than the slip rate threshold $R_{ref}$, then the supply current to the actuator 16 is dropped to the limited value, e.g. 2A to return the electromagnetic valve 30a to the hold mode. By holding the reduced fluid pressure in the wheel cylinder, the wheel speed $V_w$ is further resumed to the target wheel speed $V_i$. When the wheel speed $V_w$ is resumed equal to or higher than the target wheel speed $V_i$, the supply current is further dropped to zero for placing the electromagnetic valve in the application mode as shown in FIG. 4. The electromagnetic valve 30a is maintained in the application mode until the wheel speed is decelerated at a wheel speed at which the wheel deceleration becomes equal to or slightly more than the deceleration threshold $a_{ref}$ e.g. $-1.2$ G. At the same time, the projected speed $V_v$ is again derived with respect to the wheel speed at which the wheel deceleration $a_w$ becomes equal to or slightly greater than the deceleration threshold $a_{ref}$. From a difference of speed of the last projected speed and the instant projected speed and the period of time from a time obtaining the last projected speed to a time obtaining the instant projected speed, a deceleration rate of the target wheel speed $V_i$ is derived. Therefore, assuming the last projected speed is $V_{v1}$, the instant projected speed is $V_{v2}$, and the period of time is $T_v$, the target wheel speed $V_i$ can be obtained from the following equation:

$$V_i = V_{v2} - (V_{v1} - V_{v2})/T_v \times t_e$$

where $t_e$ is an elapsed time from the time at which the instant projected speed $V_{v2}$ is obtained.

Based on the input timing, deceleration value $a_w$ is derived from the foregoing equation (1). In addition, the projected speed $V_v$ is estimated as a function of the wheel speed $V_w$ and rate of change thereof. Based on the instantaneous wheel speeds $V_{w1}$ at which the wheel deceleration is equal to or less than the deceleration threshold $a_{ref}$ and the predetermined fixed value, e.g. 0.4 G for the first skid cycle of control operation, the target wheel speed $V_i$ is calculated. According to equation (2), the slip rate R is calculated, using successive wheel-speed values $V_{w1}$, $V_{w2}$, $V_{w3}$ ... as parameters. The derived slip rate R is compared with the slip rate threshold $R_{ref}$. As the wheel speed $V_w$ drops below the projected speed $V_v$ at the time $t_1$, the controller unit 202 switches the control mode from the application mode to the hold mode. Assuming also that the slip rate R exceeds the slip rate threshold at the time $t_4$, then the controller unit 202 switches the control mode to the release mode to release the fluid pressure at the wheel cylinder.

Upon release of the brake pressure in the wheel cylinder, the wheel speed $V_w$ recovers, i.e. the slip rate R drops until it is less than the slip rate threshold. The controller unit 202 detects when the slip rate R is less than the slip rate threshold $R_{ref}$ and switches the control mode from release mode to the hold mode.

By maintaining the brake system in the hold mode in which reduced brake pressure is applied to the wheel cylinder, the wheel speed increases until it reaches the projected speed. When the wheel speed $V_w$ becomes equal to the target wheel speed $V_w$, the controller unit 202 switches the control mode from the hold mode to the application mode.

As can be appreciated from the foregoing description, the control mode will tend to cycle through the control modes in the order application mode, hold mode, release mode and hold mode. This cycle of variation of the control modes will be referred to hereafter as "skid cycle". Practically speaking, there will of course be some hunting and other minor deviations from the standard skid cycle.

The projected speed $V_v$, which is meant to represent ideal vehicle speed behavior, at time $t_1$ can be obtained directly from the wheel speed $V_w$ at that time since zero slip is assumed. At the same time, the deceleration value of the vehicle will be assumed to be a predetermined fixed value or the appropriate one of a family thereof, in order to enable calculation of the target wheel speed for the first skid cycle operation. Specifically, in the shown example, the projected speed $V_v$ at the time $t_1$ will be derived from the wheel speed $V_{w1}$ at that time. Using the predetermined deceleration value, the projected speed will be calculated at each time the wheel deceleration $a_w$ in the application mode reaches the deceleration threshold $a_{ref}$.

The wheel deceleration $a_w$ becomes equal to or slightly greater than the deceleration threshold $a_{ref}$, then the second projected speed $V_{v2}$ is obtained at a value equal to the instantaneous wheel speed $V_w$. According to the above-mentioned equation, the deceleration value da can be obtained $$da = (V_{v1} - V_{v2})/(t_9 - t_1)$$

Based on the derived deceleration value da, the target wheel speed $V_i'$ for the second skid cycle of control operation is derived by:

$$V_i' = V_{v2} - da \times t_e$$

Based on the derived target wheel speed, the slip rate threshold $R_{ref}$ for the second cycle of control operation is also derived. The control mode will be varied during the second cycle of skid control operation, to hold mode, when the wheel deceleration reaches the deceleration threshold $a_{ref}$ as set forth above, to release mode, when the slip rate R reaches the slip rate threshold $R_{ref}$, to hold mode when the slip rate R is recovered to the slip rate threshold $R_{ref}$, and to application mode when the wheel speed $V_w$ recovered or resumed to the target wheel speed $V_i'$. In addition, it should be appreciated that in the subsequent cycles of the skid control operations, the control of the operational mode of the electromagnetic valve as set forth with respect to the second cycle of control operation, will be repeated.

Relating to the above control operations to the structure of FIGS. 3 through 6, when application mode is used, no electrical current is applied to the actuator of the electromagnetic valve 16a so that the inlet port 16b communicates with the outlet port 16c, allowing fluid flow between the pressure passage 42 and the brake pressure line 46. A limited amount of electrical current (e.g. 2A) is applied as to actuate the electromagnetic valve 16a to its limited stroke position by means of the actuator 16, and the maximum current is applied to the actuator as long as the wheel speed $V_w$ is not less than the projected speed and the slip rate is greater than the slip rate threshold $R_{ref}$. Therefore, the control mode is switched from the application mode to the hold mode and then to the release mode. The slip rate increases back up to the slip rate threshold $R_{ref}$, so that the control mode returns to the hold mode, the actuator driving the electromagnetic valve 16a to its central holding position with the limited amount of electrical current as the control signal. When the wheel speed $V_w$ finally returns to the level of the target wheel speed $V_i$, the actuator 16 supply current is cut off so that the electromagnetic valve 16a returns to its rest position in order to establish fluid communication between the pressure line 42 and the braking pressure line 46 via inlet and outlet ports 16b and 16c.

Figure 22:
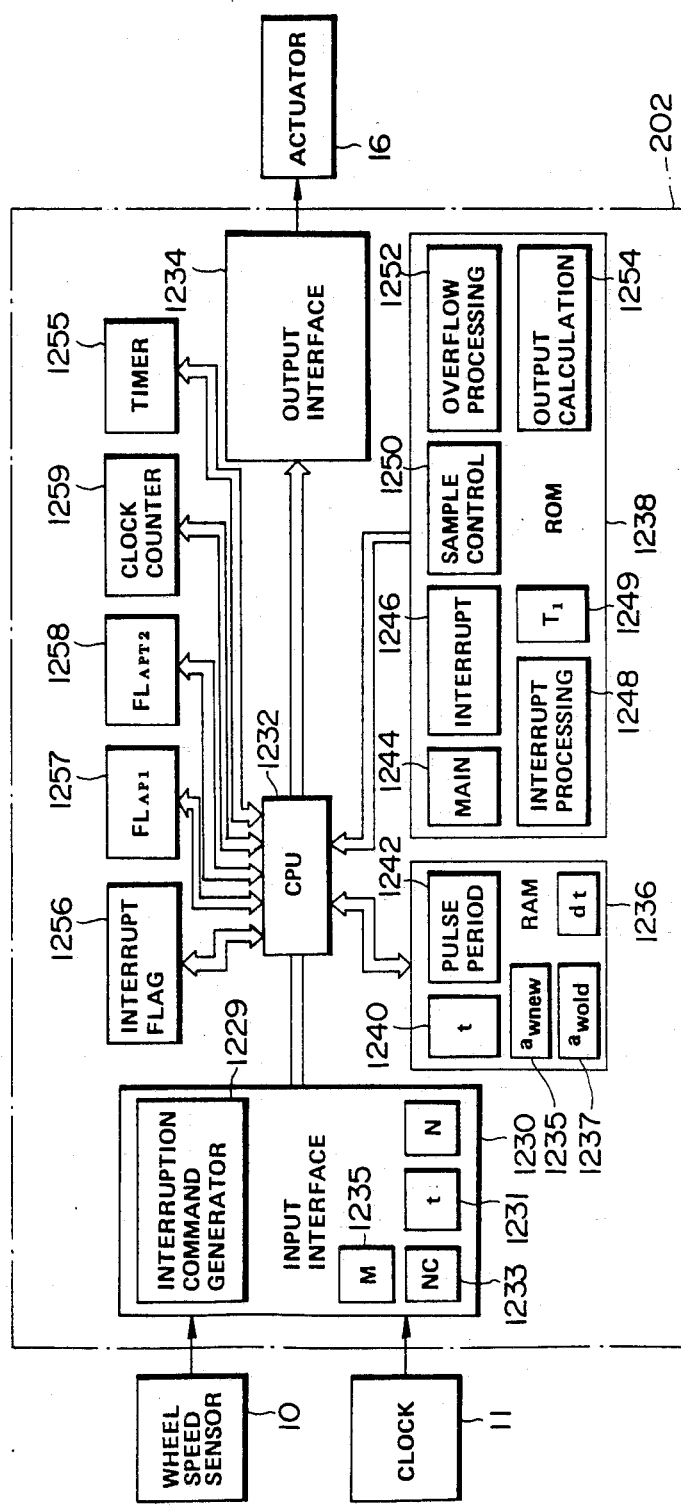
FIG. 22 is a block diagram of another embodiment of a controller unit in the anti-skid brake control system according to the present invention.

Referring to FIG. 22, the controller unit 202 includes an input interface 1230, CPU 1232, an output interface 1234, RAM 1236 and ROM 1238. The input interface 1230 includes an interrupt command generator 1229 which produces an interrupt command in response to every sensor pulse. In ROM, a plurality of programs including a main program (FIG. 23), an interrupt program (FIG. 24), an sample control program, a timer overflow program and an output calculation program (FIG. 25) are stored in respectively corresponding address blocks 1244, 1246, 1250, 1252 and 1254.

The input interface also has a temporary register for temporarily holding input timing for the sensor pulses. RAM 1236 similarly has a memory block holding input timing for the sensor pulses. The contents of the memory block 1240 of RAM may be shifted whenever calculations of the pulse interval, wheel speed, wheel acceleration or deceleration, target wheel speed, slip rate and so forth are completed. One method of shifting the contents is known from the corresponding disclosure of the U.S. Pat. No. 4,408,290. The disclosure of the U.S. Pat. No. 4,408,290 is hereby incorporated by reference. RAM also has a memory block 1242 for holding pulse intervals of the input sensor pulses. The memory block 1242 is also adapted to shift the contents thereof according to the manner similar to set forth in the U.S. Pat. No. 4,408,290.

An interrupt flag 1256 is provided in the controller unit 202 for signalling interrupt requests to the CPU. The interrupt flag 1256 is set in response to the interrupt command from the interrupt command generator 1229. A timer overflow interrupt flag 1258 is adapted to set an overflow flag when the measured interval between any pair of monitored sensor pulses exceeds the a capacity of a clock counter.

In order to time the arrival of the sensor pulses, a clock is connected to the controller unit 202 to time signals indicative of elapsed real time. The timer signal value is latched whenever a sensor pulse is received and stored in either or both of the temporary register 1231 in the input interface 1230 and the memory block 1240 of RAM 1236.

The controller unit 202 also includes memory blocks 1235 and 1237 in RAM for storing the last two wheel acceleration values. The wheel acceleration value derived in the most recent calculation will be hereafter referred to as "new wheel acceleration $a_{wnew}$" and the wheel acceleration value derived in the immediately preceding calculation will be hereafter referred to as "old wheel acceleration $a_{wold}$". The memory block 1235 is adapted to store the new wheel acceleration $a_{wnew}$ and to be updated whenever a new wheel acceleration is derived. The content of the memory block 1235 is transferred to the memory block 1237 which is adapted to store the old wheel acceleration $a_{wold}$. The controller unit 202 also has a timer 1255 and flag registers 1257 and 1258 respectively adapted to hold flags $FL_{APT1}$ and $FL_{APT2}$. The flag $FL_{APT1}$ is indicative of the operation state of the pressure control system while APPLICATION MODE is maintained for a period of time $T_1$ depending upon the peak value of wheel acceleration. The flag $FL_{APT2}$ is indicative of operation in HOLD mode for a given fixed period $T_2$. The timer 1255 is adapted to measure the given period of time $T_1$ and $T_2$ and producing a signal indicative of elapsed time $t_a$.

The operation of the controller unit 202 and the function of each elements mentioned above will be described with reference to FIGS. 23 to 33.

Figure 23:
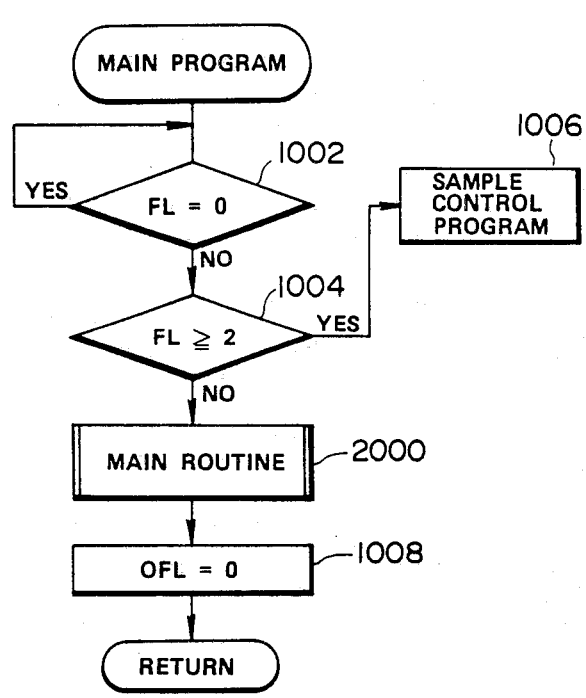
FIG. 23 is a flowchart of a main program of a microcomputer constituting the controller unit of FIG. 17.

FIG. 23 illustrates the main program for the anti-skid control system. Practically speaking, this program will generally be executed as a background job, i.e. it will have a lower priority than most other programs under the control of the same processor. Its first step 1002 is to wait until at least one sample period, covering a single sensor pulse or a group thereof, as described in more detail below, is completed as indicated when a sample flag FL has a non-zero value. In subsequent step 1004, the sample flag FL is checked for a value greater than one, which would indicate the sample period is too short. If this is the case, control passes to a sample control program labelled "1006" in FIG. 23 but shown in more detail in FIG. 24. If FL=1, then the control process is according to plan, and control passes to a main routine explained later with reference to FIG. 25. Finally, after completion of the main routine, a time overflow flag OFL is reset to signify successful completion of another sample processing cycle, and the main program ends.

Figure 24:
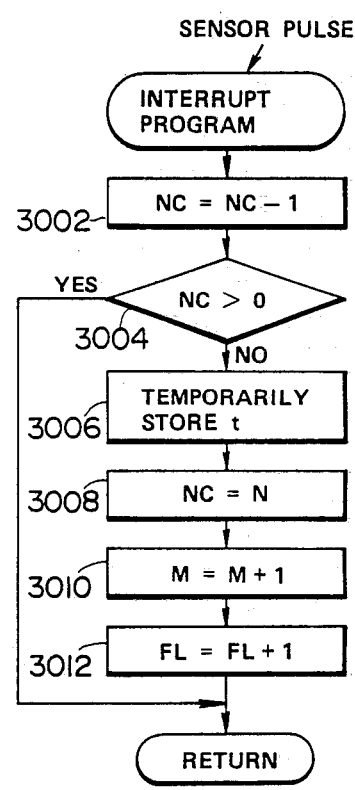
FIG. 24 is a flowchart of an interrupt program executed by the controller unit.

FIG. 24 shows the interrupt program stored in the memory block 1246 of ROM 1238 and executed in response to the interrupt command generated by the interrupt command generator 1229 whenever a sensor pulse is received. It should be noted that a counter value NC of an auxiliary counter 1233 is initially set to 1, a register N representing the frequency divider ratio is set at 1, and a counter value M of an auxiliary counter 1235 is set at −1. After starting execution of the interrupt program, the counter value NC of the auxiliary counter 233 is decremented by 1 at a block 3002. The auxiliary counter value NC is then checked at a block 3004 for a value greater than zero. For the first sensor pulse, since the counter value NC is decremented by 1 (1−1=0) at the block 3002 and thus is zero, the answer of the block 3004 is NO. In this case, the clock counter value t is latched in a temporary register 1231 in the input interface 1230 at a block 3006. The counter value NC of the auxiliary counter 1233 is thereafter assigned the value N in a register 1235, which register value N is representative of frequency dividing ratio determined during execution of the main routine explained later, at a block 3008. The value M of an auxiliary counter 1235 is then incremented by 1. The counter value M of the auxiliary counter 1235 labels each of a sequence of sample periods covering an increasing number of sensor pulses. After this, the sample flag FL is incremented by 1 at a block 3012. After the block 3012, interrupt program ends, returning control to the main program or back to block 3002, whichever comes first.

On the other hand, when the counter value NC is non-zero when checked at the block 3004, this indicates that not all of the pulses for this sample period have been received, and so the interrupt program ends immediately.

This interrupt routine thus serves to monitor the input timing t of each pulse sampling period, i.e. the time t required to receive NC pulses, and signals completion of each sample period (M=0 through M=10, for example) for the information of the main program.

Before describing the operation in the main routine, the general method of grouping the sensor pulses into sample periods will be explained to facilitate understanding of the description of the operation in the main routine.

In order to enable the controller unit 202 to accurately calculate the wheel acceleration $a_w$, it is necessary that the difference between the pulse intervals of the single or grouped sensor pulses exceeding a given period of time, e.g. 4 ms. In order to obtain the pulse interval difference exceeding the given period of time, 4 ms, which given period of time will be hereafter referred to as "pulse interval threshold S", some sensor pulses are ignored so that the recorded input timing t of the sensor pulse groups can satisfy the following formula:

$$dT = (C-B) - (B-A) \geq S(4 \text{ ms.}) \quad (3)$$

where A, B and C are the input times of three successive sensor pulse groups.

Figure 26:
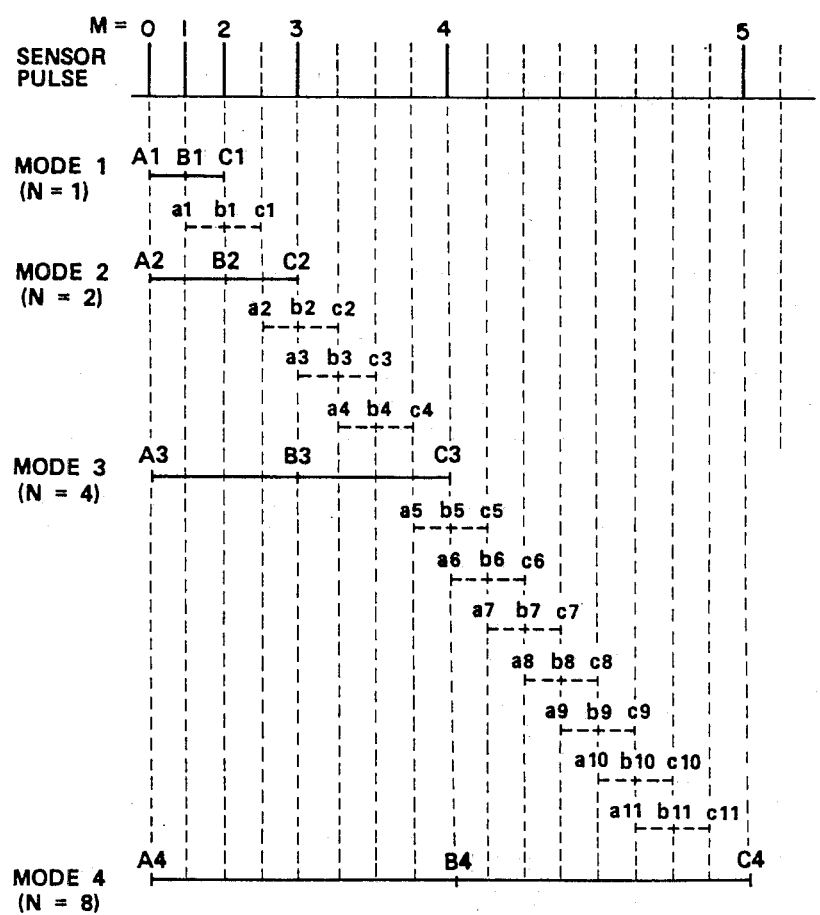
FIG. 26 is an explanatory diagram of the input timing sampling modes and variation thereof.

The controller unit 202 has different sample modes, i.e. MODE 1, MODE 2, MODE 3 and MODE 4 determining the number of sensor pulses in each sample period group. As shown in FIG. 26, in MODE 1 every sensor pulse input time is recorded and therefore the register value N is 1. In MODE 2, every other sensor pulse is ignored and the register value N is 2. In MODE 3, every fourth sensor pulse is monitored, i.e. its input time is recorded, and the register value N is 4. In MODE 4, every eighth sensor pulse is sampled and the register value N is then 8.

The controller unit 202 thus samples the input timing of three successive sensor pulses to calculate the pulse interval difference dT while operating in MODE 1. If the derived pulse interval difference is equal to or greater than the pulse interval threshold S, then sensor pulses will continue to be sampled in MODE 1. Otherwise, the input timing of every other sensor pulse is sampled in MODE 2 and from the sampled input timing of the next three sensor pulses sampled, the pulse interval difference dT is calculated to again be compared with the pulse interval threshold S. If the derived pulse interval difference is equal to or greater than the pulse interval threshold S, we remain in MODE 2. Otherwise, every four sensor pulses are sampled in MODE 3. The input timings of the next three sampled sensor pulses are processed to derive the pulse interval difference dT. The derived pulse interval difference dT is again compared with the pulse interval threshold S. If the derived pulse interval difference is equal to or greater than the pulse interval threshold S, the MODE remains at 3 and the value N is set to 4. On the other hand, if the derived pulse interval difference dT is less than the pulse interval threshold S, the mode is shifted to MODE 4 to sample the input timing of every eighth sensor pulse. In this MODE 4, the value N is set at 8.

For instance, in FIG. 26, the sensor pulses $A_1$, $B_1$ and $C_1$ are sampled under MODE 1. In MODE 2, the sensor pulses $a_1$ and $c_1$ are ignored and the sensor pulses $A_1$ ($=A_2$), $B_2$ ($=b_1$) and $C_2$ ($=b_2=a_3$) are sampled. In MODE 3, the three sensor pulses $c_2$ ($=b_3=a_4$), $c_3$ ($=b_4$) and $c_4$ following $B_3$ ($=c_2$) are ignored and the sensor pulses $A_3$ ($=A_1=A_2$), $B_3$ ($=b_2=a_3$) and $C_3$ ($=b_5=a_6$) are sampled. In MODE 4, the seven sensor pulses $c_5$ ($=b_6=a_7$), $c_6$ ($=b_7=a_8$), $c_7$ ($=b_8=a_9$), $c_8$ ($=b_9=a_{10}$), $c_9$ ($=b_{10}=a_{11}$), $c_{10}$ ($=b_{11}$) and $c_{11}$ following $B_4$ ($=c_3$) are ignored and the sensor pulses $A_4$ ($=A_1=A_2=A_3$), $B_4$ ($=C_3=b_5=a_6$) and $C_4$ are sampled.

Figure 25:
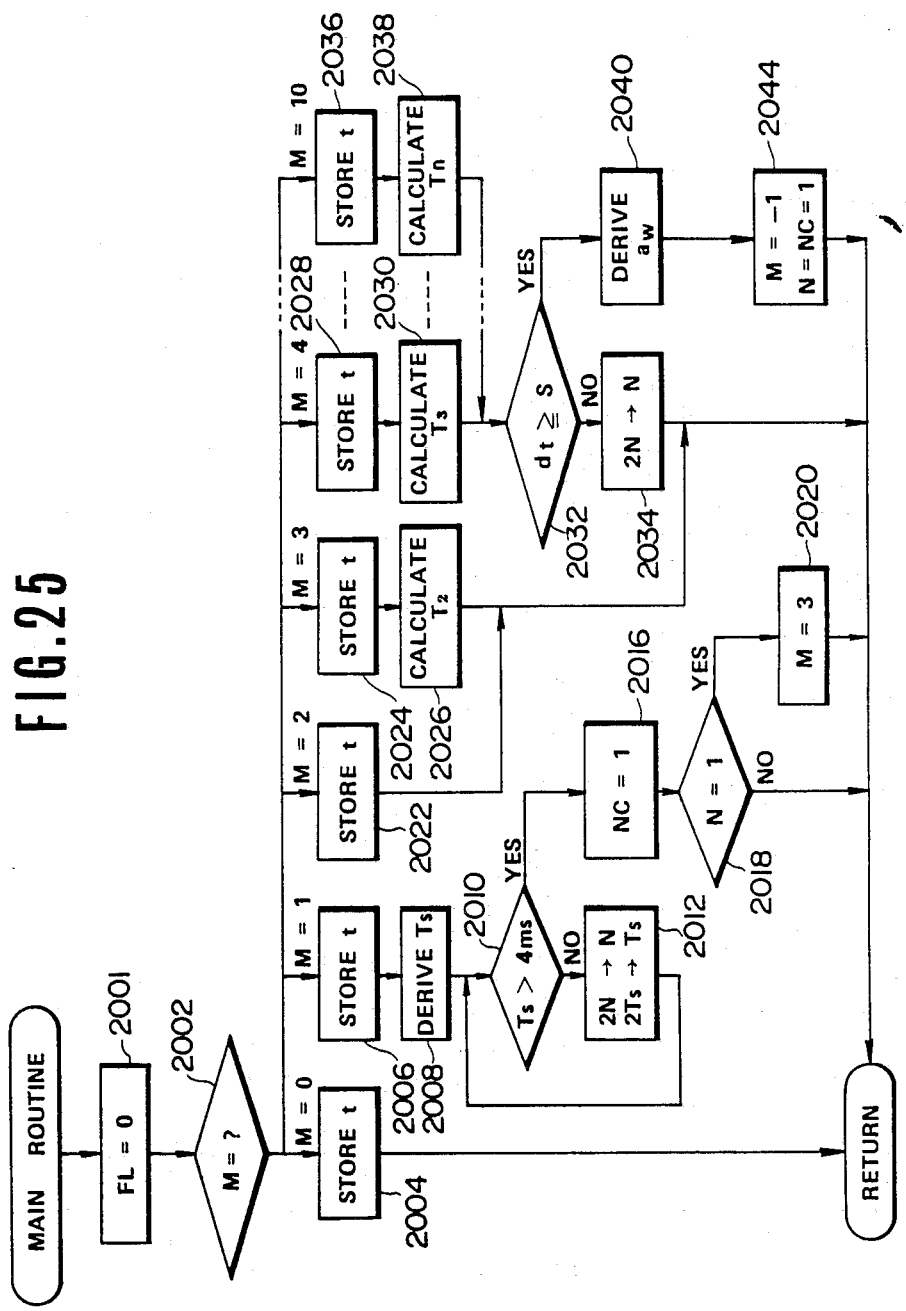
FIG. 25 is a flowchart of a main routine in the main program of FIG. 23.

Referring to FIG. 25, the main routine serves to periodically derive an updated wheel acceleration value $a_w$. In general, this is done by sampling greater and larger groups of pulses until the difference between the durations of the groups is large enough to yield an accurate value. In the main routine, the sample flag FL is reset to zero at a block 2001. Then the counter value M of the auxiliary counter 1233, indicating the current sample period of the current $a_w$ calculation cycle, is read out at a block 2002 to dictate the subsequent program steps.

Specifically, after the first sample period (M=∅), the input timing t temporarily stored in the temporary register 1231 corresponding to the sensor pulse number (M=0) is read out and transferred to a memory block 240 of RAM at a block 2004, which memory block 1240 will be hereafter referred to as "input timing memory". Then control passes to the block 1008 of the main program. When M=2, the corresponding input timing t is read out from the temporary register 1231 and transferred to the input timing memory 1240 at a block 2006. Then, at a block 2008, a pulse interval Ts between the sensor pulses of M=1 is derived from the two input timing values in the input timing memory 1240. That is, the pulse interval of the sensor pulse (M=1) is derived by:

$$Ts = t_1 - t_0$$

where
$t_1$ is input time of the sensor pulse M1; and
$t_0$ is input time of the sensor pulse M0.

The derived pulse interval $T_s$ of the sensor pulse M1 is then compared with a reference value, e.g. 4 ms., at a block 2010. If the pulse interval $T_s$ is shorter than the reference value, 4 ms., control passes to a block 2012 wherein the value N and the pulse interval $T_s$ are multiplied by 2. The doubled timing value ($2 T_s$) is again compared with the reference value by returning to the block 2010. The blocks 2010 and 2012 constitute a loop which is repeated until the pulse interval ($2 nT_s$) exceeds the reference value. When the pulse interval ($2 nT_s$) exceeds the reference value at the block 2010, a corresponding value of N (2N) is automatically selected. This N value represents the number of pulses to be treated as a single pulse with regard to timing.

After setting the value of N and thus deriving the sensor pulse group size then the auxiliary counter value NC is set to 1, at a block 2016. The register value N is then checked for a value of 1, at a block 2018. If N=1, then the auxiliary counter value M is set to 3 at a block 2020 and otherwise control returns to the main program. When the register value N equals 1, the next sensor pulse, which would normally be ignored, will instead be treated as the sensor pulse having the sample period number M=3.

In the processing path for the sample period number M=3, the corresponding input timing is read from the corresponding address of the temporary register 231 and transferred to the input timing memory 1240, at a block 2024. The pulse interval $T_2$ between the sensor pulses at M=1 and M=3 is then calculated at a block 2026. The derived pulse interval $T_2$ is written in a storage section of a memory block 1242 of RAM 1236 for a current pulse interval data, which storage section will be hereafter referred at as "first pulse interval storage" and which memory block 1242 will be hereafter referred to as "pulse interval memory". After the block 2026, control returns to the main program to await the next sensor pulse, i.e. the sensor pulse for sample period number M=4.

When the sensor pulse for M=4 is received, the value t of the temporary register 1231 is read out and transferred to the input timing memory 240 at block 2028. Based on the input timing of the sensor pulses for M=3 and M=4, the pulse interval $T_3$ is calculated at a block 2030. The pulse interval $T_3$ derived at the block 2030 is then written into the first pulse interval storage of the pulse interval memory. At the same time, the pulse interval data $T_2$ previously stored in the first pulse interval storage is transferred to another storage section of the pulse interval memory adapted to store previous pulse interval data. This other storage section will be hereafter referred to as "second pulse interval storage". Subsequently, at a block 2032 the contents of the first and second storages, i.e. the pulse interval data $T_2$ and $T_3$ are read out. Based on the read out pulse interval data $T_2$ and $T_3$, a pulse interval difference dT is calculated at block 2032 and compared with the pulse interval threshold S to determine whether or not the pulse interval difference dT is large enough for accurate calculation of wheel acceleration or deceleration $a_w$. If so, process goes to the block 2040 to calculate the wheel acceleration or deceleration according to the equation (1). Detail of the wheel acceleration or deceleration deriving routine at the block 2040 will be described later with reference to FIG. 26. The register value N is then set to 1 at the block 2044 and thus MODE 1 is selected. In addition sample period number M is reset to −1, and the $a_w$ derivation cycle starts again. On the other hand, if at the block 2032 the pulse interval difference dT is too small to calculate the wheel acceleration or deceleration $a_w$, then the value N is multiplied by 2 at a block 2034. Due the updating of the value N, the sample mode of the sensor pulses is shifted to the next mode.

When the block 2034 is performed and thus the sample mode is shifted to MODE 2 with respect to the sensor pulse of M=4', the sensor pulse $c_2$ input following to the sensor pulse of M=4' is ignored. The sensor pulse $c_3$ following to the ignored sensor pulse $c_2$ is then taken as the sensor pulse to be sampled as M=3". At this time, the sensor pulse of M=4' is treated as the sensor pulse of M=2" and the sensor pulse of M=2 is treated as the sensor pulse of M=1". Therefore, calculation of the interval difference dT and discrimination if the derived interval difference dT is greater than the pulse interval threshold S in the block 2032 will be carried out with respect to the sensor pulse $c_3$ which will be treated as the sensor pulse of M=4". The blocks 2032 and 2034 are repeated until the interval difference greater than the pulse interval threshold S is obtained.

The procedure taken in each cycle of repetition of the blocks 2032 and 2034 is substantially same as that set forth above.

As set forth above, by setting the counter value NC of the auxiliary counter 233 to 1 at the block 2016, the input timing of the sensor pulse received immediately after initially deriving the sample mode at the blocks 2010 and 2012 will be sampled as the first input timing to be used for calculation of the wheel acceleration. This may be contrasted with the procedure taken in the known art.

Figure 27:
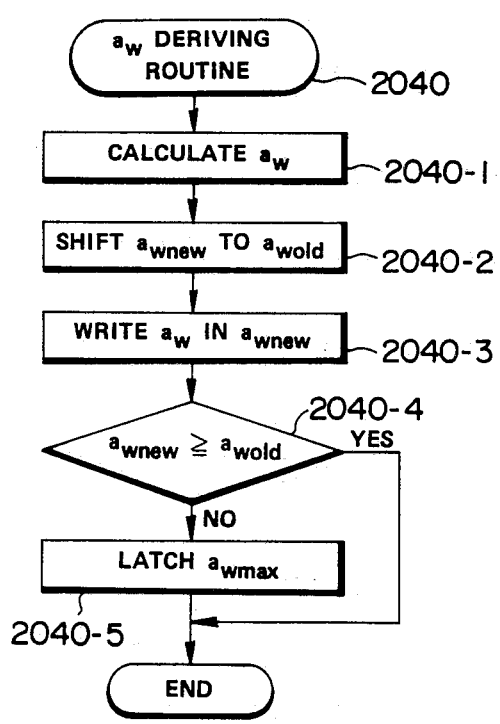
FIG. 27 is a flowchart of a wheel acceleration deriving routine in the main routine of FIG. 25.

FIG. 27 shows the wheel acceleration deriving routine of the step 2040 of FIG. 25. At first, wheel acceleration $a_w$ is calculated from three input timing values as explained with respect to the step 2040, at a step 2040-1. After this, the stored value, i.e. the new wheel acceleration value $a_{wnew}$, in the memory block 1235 is shifted to the memory block 1237 to be stored as the old wheel acceleration value $a_{wold}$ at a step 2040-2. Then, the wheel acceleration value newly derived at the step 2040-1 is written in the memory block 1235 at a step 2040-3. Thereafter, at a step 2040-4, the new and old wheel acceleration values $a_{wnew}$ and $a_{wold}$ are compared. If the new wheel acceleration value $a_{wnew}$ is equal to or greater than the old wheel acceleration value $a_{wold}$, control returns to the main routine of FIG. 20. On the other hand, if the new wheel acceleration $a_{wnew}$ is less than the old wheel acceleration $a_{wold}$, the value stored in the memory block 1237 as the old wheel acceleration value $a_{wold}$ is latched as the peak value $a_{wmax}$ of the wheel acceleration.

Figure 28:
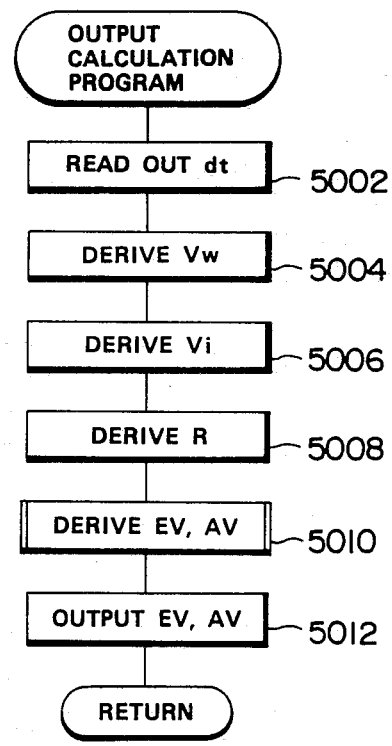
FIG. 28 is a flowchart of an output calculation program for deriving EV and AV signals for controlling operation mode of the electromagnetic valve according to the valve conditions of FIGS. 3, 5 and 6.

FIG. 28 shows the output program for deriving the wheel speed $V_w$, wheel acceleration $a_w$ and slip rate R, selecting the operational mode, i.e. application mode, hold mode and release mode and outputting an inlet signal EV and/or an outlet signal AV depending upon the selected operation mode of the actuator 16.

When the application mode is selected the inlet signal EV goes HIGH and the outlet signal EV goes HIGH. When the release mode is selected, the inlet signal EV goes LOW and the outlet signal AV also goes LOW. When the selected mode is the hold mode, the inlet signal EV remains HIGH while the outlet signal AV goes LOW. These combinations of the inlet signal EV and the outlet signal AV correspond to the actuator supply current levels shown in FIG. 11 and thus actuate the electromagnetic valve to the corresponding positions illustrated in FIGS. 4, 5 and 6.

The output program is stored in the memory block 1254 and adapted to be read out periodically, e.g. every 10 ms, to be executed as an interrupt program. The output calculation program is executed in the time regions shown in hatching in FIGS. 30 and 31.

Figure 29:
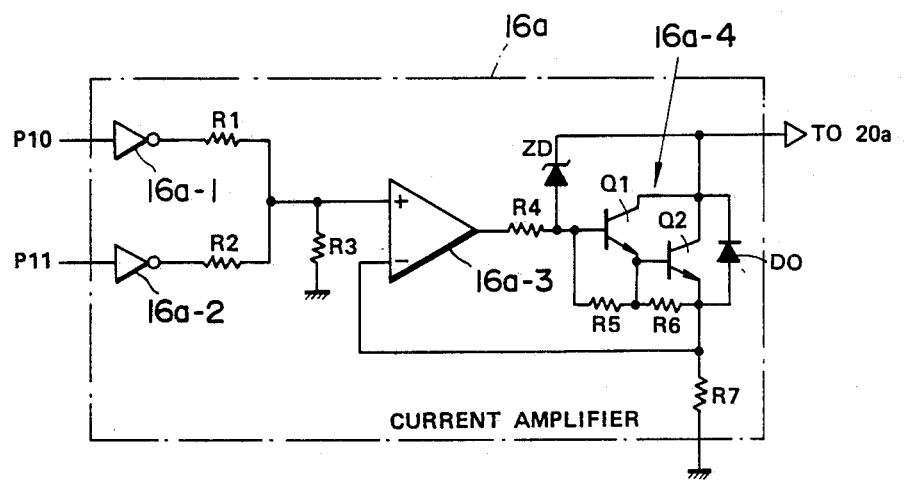
FIG. 29 is a circuit diagram of a current amplifier which modulates a control signal from EV and AV signals.
Figure 30:
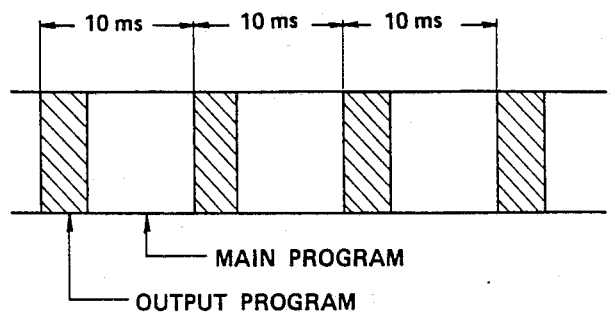
FIGS. 30 and 31 are diagram of execution timing of the output calculation program in relation to the main program of FIG. 23.
Figure 31:
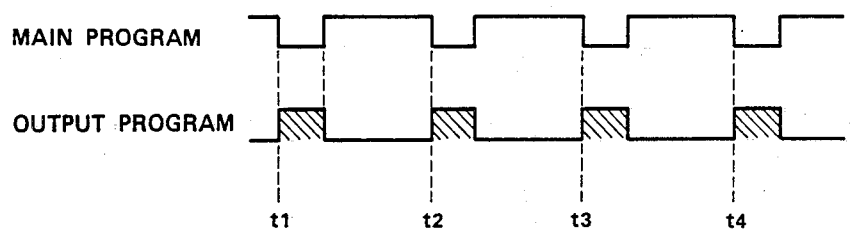
Figure 32:
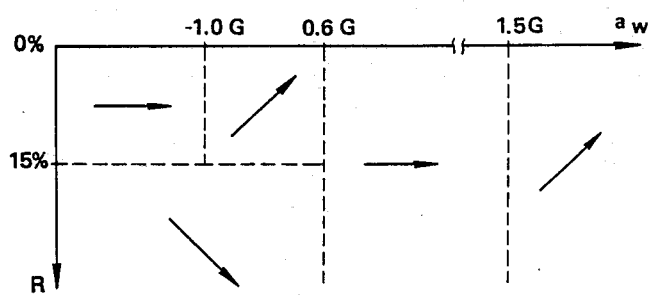
FIG. 32 is a table for determining the operation mode of the actuator 16, which table is accessed in terms of the wheel acceleration and the slip rate.
Figure 33:
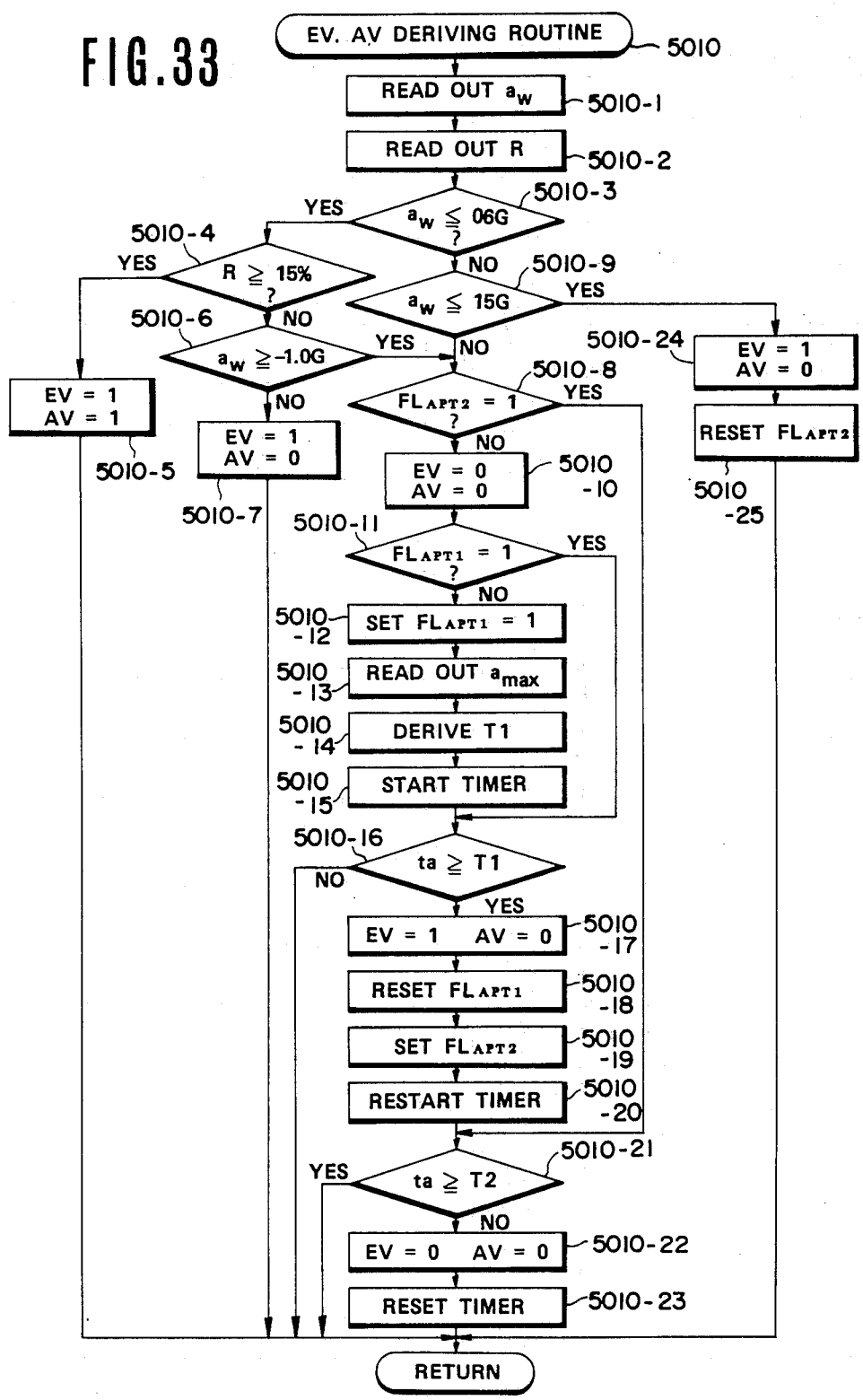
FIG. 33 is a flowchart of the EV and AV deriving routine in the output calculation program of FIG. 28.

Though it has not been illustrated in FIG. 22, a current amplifier 16a is inserted between the controller 202 and the actuator 16. As shown in FIG. 29, the output interface 1234 connected to inverters 16a-1 and 16a-2 of the current amplifier 16a. The outputs at the output ports $P_{10}$ and $P_{11}$ are inverted by the inverters 16a-1 and 16a-2. The inverters 16a-1 and 16a-2 are connected to each other through resistors $R_1$ and $R_2$ to sum the inverted values. An operational amplifier 16a-3 is adapted to receive input which level corresponds to the charge level at the ends of a resistor $R_3$ resulting from the sum value of the inverted outputs of the microprocessor, at the positive input terminal. The negative input terminal of the operational amplifier 16a-3 is connected to a Darlington amplifier 16a-4 which is constituted of transistors Q₁ and Q₂, to receive therefrom the feedback signal.

The output of the operational amplifier 16a-3 is connected to the base electrode of the transistor Q₁ in the Darlington amplifier 16a-4 via a resistor R₄. On the other hand, the output of the operational amplifier 16a-3 is connected to the base electrode of the transistor Q₂ via voltage divider 16a-5 including resistors R₅ and R₆. A diode D0 is provided for surge prevention and a Zener diode ZD is provided for regulating potential at the collector electrodes of the transistors Q₁ and Q₂. Further, by the feedback of the potential at the end of a resistor R₇ to the negative input of the operational amplifier 16a-3, the regulation of the collector potentials is assured.

The current amplifier 16a is adapted to combine the EV and AV signals output through the output interface 1234 of the controller unit 202 to produce actuator driver signal which has currrent value variable to operate the actuator to different operational modes. In the practical embodiment, the signal value output from the current amplifier varies according to the following table:

| Mode | EV | AV | Current (A) |
|---|---|---|---|
| APPLICATION | LOW | LOW | 0 |
| HOLD | HIGH | LOW | 2 |
| RELEASE | HIGH | HIGH | 5 |

By this arrangement, the actuator 16 is operated to the different operational mode by the combinations of EV and AV signals.

During execution of the output calculation program, the pulse interval T is read out from a memory block 241 of RAM which stores the pulse interval, at a block 5002. At set forth above, since the pulse interval T is inversely proportional to the wheel rotation speed $V_w$, the wheel speed can be derived by calculating the reciprocal (1/T) of the pulse interval T. This calculation of the wheel speed $V_w$ is performed at a block 5004 in the output program. After the block 5004, the target wheel speed $V_i$ is calculated at a block 5006. The manner of deriving the target wheel speed $V_i$ has been illustrated in the U.S. Pat. Nos. 4,392,202 to Toshiro MATSUDA, issued on July 5, 1983; 4,384,330 to Toshiro MATSUDA, issued May 17, 1983; and 4,430,714 also to Toshiro MATSUDA, issued on Feb. 7, 1984, all assigned to the assignee of the present invention. The disclosure of the above-identified three United States Patents are hereby incorporated by reference.

As is obvious herefrom, the target wheel speed $V_i$ is derived as a function of wheel speed deceleration as actually detected.

$$dV_i = (V_{w1} - V_{w2})/P \quad (4)$$

This target wheel speed $V_i$ is used for skid control in the next skid cycle.

It should be appreciated that, in the first skid cycle, the target wheel speed $V_i$ cannot be obtained. Therefore, for the first skid cycle, a predetermined fixed value will be used as the target wheel speed $V_i$.

At a block 5008, (FIG. 28) the slip rate R is calculated according to the foregoing formula (2). Subsequently, the operational mode is determined on the basis of the wheel acceleration $a_w$ and the slip rate R, at a block 5010. FIG. 27 is a flowchart of an EV/AV deriving routine to be executed at the step 5010 of FIG. 28. The schedule of operation mode selection of the actuator 16 is illustrated in the form of a table in FIG. 26. The table is accessed according to the wheel acceleration $a_w$ and the slip rate R. As can be seen, when the wheel slip rate R is in the range of 0 to 15%, the hold mode is selected when the wheel acceleration $a_w$ is less than $-1.0$ G and the application mode is selected when the wheel acceleration $a_w$ is in the range of $-1.0$ G to 0.6 G. On the other hand, when the slip rate R remains above 15%, the release mode is selected when the wheel acceleration $a_w$ is equal to or less than 0.6 G, and the hold mode is selected when the wheel acceleration is in a range of 0.6 G to 1.5 G. When the wheel acceleration $a_w$ is equal to or greater than 1.5 G, the application mode is selected regardless of the slip rate.

According to the operational mode selected at the block 5010, the signal levels of the inlet signal EV and the outlet signal AV are determined so that the combination of the signal levels corresponds to the selected operation mode of the actuator 16. The determined combination of the inlet signal EV and the outlet signal AV are output to the actuator 16 to control the electromagnetic valve.

It should be appreciated that, although the execution timing of the output calculation program has been specified to be about 10 ms in the foregoing disclosure, the timing is not necessarily fixed to the mentioned timing and may be selectable from the approximate range of 1 ms to 20 ms. The execution timing of the output program is fundamentally to be determined in accordance with the response characteristics of the actuator.

In the routine for deriving EV and AV signals of FIG. 27, wheel acceleration $a_w$ is read out at a step 5010-1. The slip rate R is thereafter read out at a step 5010-2. At a step 5010-3, the wheel acceleration value $a_w$ read out at the step 5010-1 is compared with a given acceleration threshold, e.g., 0.6 G. If the wheel acceleration $a_w$ is equal to or less than the wheel acceleration threshold, then the slip rate R read out at the step 5010-2 is compared with a slip rate threshold, e.g. 15%, at a step 5010-4. If the slip rate R is equal to or greater than the slip rate threshold, the inlet signal EV is set to 1 (HIGH) and the outlet signal AV is also set to 1 (HIGH), at a step 5010-5. Thereafter, control returns to the output calculation program of FIG. 23.

On the other hand, if the slip rate R when checked at the step 5010-4 is less than the slip rate threshold, then the wheel acceleration $a_w$ is compared with a given deceleration threshold, e.g., $-1.0$ G, at a step 5010-6. If the wheel acceleration $a_w$ when checked at the step 5010-6 is less than the given deceleration threshold, the inlet signal EV is set to 1 (HIGH) and the outlet signal AV is set to 0 (LOW), at a step 5010-7.

Figure 18:
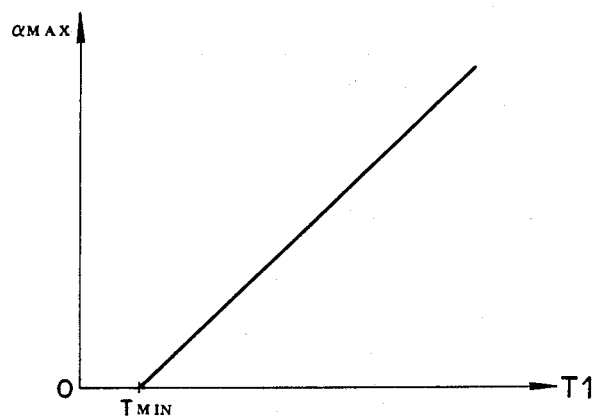
FIG. 18 is a graph illustrating a relationship of peak value $a_{max}$ derived by the peak detector circuit of FIG. 12 and the duration to hold the control in APPLICATION mode.

If the flag $FL_{APT2}$ is not set when checked at the step 5010-8, the inlet signal EV is set to 0 (LOW) and the outlet signal AV is set to 0 (LOW) at a step 5010-10. After this, the content of the flag register 1257 are checked to see if the flag $FL_{APT1}$ is set, at a step 5010-11. If the flag $FL_{APT1}$ is not set, the flag $FL_{APT1}$ is set at a step 5010-12. Thereafter, the latched peak value of the wheel acceleration $a_{wmax}$ is read out at a step 5010-13. Based on the peak value $a_{wmax}$, the given period $T_1$ for which the actuator 16 is to be held in APPLICATION MODE to increase the fluid pressure in the wheel cylinder, is derived, at a step 5010-14. In the block 5010-14, table look-up is performed to look-up a table 1249 in ROM 1238 in terms of the peak value $a_{wmax}$. The table 1249 stores values indicative of the period of time $T_1$ which is indicative of the OFF-duty in the duty cycle of the control signal in the APPLICATION mode. The period T1 may be variable proportional to variation of the pak value of wheel acceleration as illustrated in FIG. 18.

Then, the timer 1255 is started to measure the elapsed time $t_a$, at a step 5010-15. The measured period of time $t_a$ is compared with the derived given period $T_1$, at a step 5010-16. Until the measured period of time $t_a$ becomes equal to or longer than the derived period of time $T_1$, control returns to the output calculation program of FIG. 28 after the step 5010-16.

After the flag $FL_{APT1}$ has once been set at the step 5010-12, control jumps from the step 5010-11 to the step 5010-16 to see whether the measured period $t_a$ is equal to or greater than the derived period of time $T_1$.

If the measured period of time $t_a$ is equal to or longer than the derived period of time $T_1$, then, the inlet signal EV is set to a value 1 (HIGH), while the outlet signal is held at 0 (LOW), at a step 5010-17. Thereafter, the flag $FL_{APT1}$ is reset at a step 5010-18 and the flag APT2 is set at a step 5010-19. Then, the timer 1255 is reset and restarted at a step 5010-20. The timer value $t_a$ is compared with a given fixed value indicative of the given fixed period of time $T_2$ at a step 5010-21. If the flag $FL_{APT2}$ is set at the step 5010-19, control jumps from the step 5010-8 to the step 5010-21 to wait for the measured period of time $t_a$ to match or exceed the given fixed period of time $T_2$. After the given fixed period of time $t_2$ expires and thus the timer signal value $t_a$ become equal to or greater than the given fixed value when checked at the step 5010-21, the inlet signal EV is reset to 0 (LOW) and the outlet signal AV is held at 0 (LOW), at a step 5010-22. Thereafter, the timer 1255 is reset at a step 5010-23.

If the wheel acceleration $a_w$ when checked at the step 5010-9 is less than the application threshold, e.g. 1.5 G, the inlet signal EV is set to 1 (HIGH) and the outlet signal is set to 0 (LOW) at a step 5010-24. Then, the flag $FL_{APT2}$ is reset at a step 5010-25.

Therefore, by repeating the sequence of blocks 5010-8 to 5010-23, the actuator of the pressure control valve can be controlled for increasing braking pressure stepwise fashion. Since the OFF-duty of the EV signal is derived according to the peak value $a_{wmax}$, the average increasing rate of braking pressure may be variable depending upon the duty radio of OFF-duty component of the EV signal and, in turn, depending upon the peak value of the wheel acceleration.

This provides substantially the same effect as that achieved by the foregoing first embodiment.

Therefore, as set forth above, the present invention fulfills all of the objects and advantages sought therefor.

What is claimed is:

1. An anti-skid brake control system for an automotive brake system comprising:
   a hydraulic brake system including a wheel cylinder for applying braking pressure to a vehicle wheel, and a pressure control valve associated with said wheel cylinder for adjusting fluid pressure in the wheel cylinder, said pressure control valve being operative to increase fluid pressure in said wheel cylinder in a first position, to decrease fluid pressure in said wheel cylinder in a second position and to hold fluid pressure in said wheel cylinder constant in a third position;
   a wheel speed sensor detecting rotational speed of the wheel and producing a wheel speed indicative signal having a value indicative of the detected wheel speed;
   a controller operative in a first mode in which said pressure control value is alternatively operated in said first and third positions, a second mode in which said pressure control valve is operated in said second position and a third mode in which said pressure control valve is operated in said third position, said controller selecting one of said first, second and third mode so as to control the wheel speed at a given optimal relationship to vehicle speed based on predetermined brake control parameters including a wheel acceleration and deceleration derived from variations of said wheel speed indicative signal values, and deriving a control signal indicative of one of said first, second and third modes selected for controlling operation of said pressure control valve to actuate the latter of one of said first, second and third positions, said controller being responsive to wheel acceleration increasing above a predetermined value for operation in said first mode to alternatively switch said pressure control valve positions between said first and third positions and varying a first period of time for maintaining said pressure control valve in said first position depending upon a peak value of said wheel acceleration, thereby adjusting the average increasing rate of fluid pressure in said wheel cylinder depending upon said peak value of said wheel acceleration.

2. The anti-skid brake control system as set forth in claim 1, wherein said controller is operative to derive said brake control parameters including wheel acceleration and wheel slip rate and to derive the control signal according to a predetermined schedule in which:
   said pressure control valve is actuated to said third position when the derived wheel deceleration is greater than a given deceleration threshold, in said third mode of said controller;
   said pressure control valve is actuated to said second position when the derived slip rate is greater than a given slip rate threshold, in said second mode of said controller;
   said pressure control valve is actuated to said third position when said slip rate is less than said slip rate threshold, in said third mode of said controller; and
   said pressure control valve is actuated to said first position and said third position alternatively in said first mode of said controller, wherein said first period of time for holding the pressure control valve in said first position is variable depending upon the peak value of said wheel acceleration and a second period of time for holding the pressure control valve in said third position is constant.

3. The anti-skid brake control system as set forth in claim 2, wherein said first mode, said controller derives said first period of time for which to hold said pressure control valve in said first position so that said first period of time varies in proportion to the peak value of wheel acceleration.

4. The anti-skid brake control system as set forth in claim 2, wherein when said derived wheel deceleration becomes equal to said given deceleration threshold, said controller further derives an estimated vehicle speed which decreases at a given deceleration value.

5. The anti-skid brake control system as set forth in claim 1, wherein said controller derives said brake control parameters including wheel acceleration and estimated vehicle speed based on wheel speeds at which wheel deceleration becomes greater than a given deceleration threshold, and a target wheel speed based on said estimated vehicle speed, and said controller further derives said control signals according to a predetermined schedule in which:

said pressure control valve is actuated to said third position when the derived wheel deceleration is greater than said given deceleration threshold, in said third mode of said controller; p1 said pressure control valve is actuated to said second position when wheel speed drops below the target wheel speed, in said second mode of said controller;

said pressure control valve is actuated to said third position when wheel acceleration is greater than a given acceleration threshold, in said third mode of said controller; and said pressure control valve is actuated to said first position and said third position alternatively, in said first mode of said controller, wherein said first period of time for holding the pressure control valve in said first position is variable depending upon the peak value of said wheel acceleration and a second period of time for holding the pressure control valve in said third position is constant.

6. The anti-skid brake control system as set forth in claim 5, wherein in said first mode, said controller controls the ratio of the first period holding the pressure control valve in said first position with respect to the second period for holding the pressure control valve in said third position, depending upon the peak value of wheel acceleration, thereby controlling the average increasing rate of fluid pressure corresponding to the peak value.

7. The anti-skid brake control system as set forth in claim 6, wherein in said first mode, said controller derives said first period of time for which to hold the pressure control valve in said first position, as a function of the peak value of wheel acceleration.

8. An anti-skid brake control system for an automotive vehicle, comprising:

a hydraulic brake system including a wheel cylinder for applying braking pressure to a vehicle wheel, and a pressure control valve associated with said wheel cylinder for adjusting fluid pressure in the wheel cylinder, said pressure control valve being operative to increase fluid pressure in said wheel cylinder in a first position, to decrease the fluid pressure in the wheel cylinder in a second position and to hold the fluid pressure in the wheel cylinder constant in a third position;

a wheel speed sensor detecting rotational speed of the wheel and producing a wheel speed indicative signal having a value indicative of the detected wheel speed;

a first means for deriving brake control parameters including a wheel acceleration value based on said wheel speed indicative signal;

a second means for latching the peak value of wheel acceleration while wheel speed is increasing; and a third means for deriving a control signal for actuating said pressure control valve to one of said first, second and third positions based on said brake control parameters, said third means deriving said control signal so as to operate said pressure control valve in said first position for a first given period of time, and to switch the position of the pressure control valve to said third position for a second given period of time after expiration of said first given period, said third means operating said pressure control valve repeatedly and alternatively in said first and third positions with a duty cycle defined by said first and second periods of time, and said third means varying said first given period of time depending upon the latched peak value of wheel acceleration.

9. The anti-skid brake control system as set forth in claim 8, wherein said first given period is derived from said latched peak value of wheel acceleration such that the average increasing rate of braking pressure increases in stepwise fashion corresponds to the latched peak value.

10. The anti-skid brake control system as set forth in claim 9, wherein said second given period is a given fixed period.

11. The anti-skid brake control system as set forth in claim 10, which comprises a plurality of hydraulic brake systems respectively adapted to apply a braking force to corresponding wheels, a plurality of wheel speed sensors for detecting wheel speeds of the corresponding wheels and a plurality of first, second and third means independently operative for controlling operation of said pressure control valves in the corresponding hydraulic brake system.

12. The anti-skid brake control system as set forth in claim 8, which comprises a first anti-skid control system for controlling a braking force of a vehicle wheel free from a vehicle driving force, a second anti-skid control system for controlling a braking force of another vehicle wheel free from said driving force, and a third anti-skid control system for controlling a braking force of vehicle wheels driven by the driving force, and each of said first, second and third control systems including a hydraulic brake system, a wheel speed sensor and a first, second and third means.

13. A method for anti-skid controlling an automotive hydraulic brake system including a wheel cylinder and a pressure control valve for controlling fluid pressure in said wheel cylinder, said pressure control valve being operative to increase fluid pressure in said wheel cylinder in a first position, to decrease fluid pressure in the wheel cylinder in a second position and to control the fluid pressure in the wheel cylinder constant in a third position, the method comprising the steps of:

detecting wheel speed;

deriving brake control parameters including wheel acceleration and deceleration based on the detected wheel speed;

selecting the operation mode of said pressure control valve from among said first, second and third positions depending upon the derived brake control parameters;

detecting the peak value of wheel acceleration;

deriving a peak-value-dependent period of time based on the detected peak value of wheel acceleration; and controlling the pressure control valve according to a predetermined schedule for controlling wheel speed at an optimal relationship to a vehicle speed, in which said pressure control valve is held in said first position for said peak-value-dependent period of time, is thereafter held in said third position for a given period of time, and repeating said procedure for holding said pressure control valve for the peak-value-dependent period of time in said first position and subsequently holding said pressure control valve for said given period in said third position so that an average increasing rate of braking pressure is increased in stepwise fashion, and is variable depending upon the peak value of the wheel acceleration.

14. The method as set forth in claim 13, wherein said peak-value-dependent period of time is derived as a function of the peak value of wheel acceleration.

15. The method as set forth in claim 14, wherein said brake control parameters include an estimated vehicle speed and a target wheel speed derived from said estimated vehicle speed, said pressure control valve is actuated to said third position when wheel deceleration is greater than a given deceleration threshold, said pressure control valve is actuated to said second position when wheel speed drops below said target wheel speed, said pressure control valve is actuated said third position when wheel acceleration is greater than a given acceleration threshold, and said pressure control valve is actuated to said first and third positions alternatively when wheel speed increases beyond said target wheel speed.

16. The method as set forth in claim 15, wherein said given period of time for which the pressure control valve is held in said third position is a fixed period.

* * * * *